(12) United States Patent
Arakawa

(10) Patent No.: US 8,798,003 B2
(45) Date of Patent: Aug. 5, 2014

(54) HYBRID COMMUNICATION TERMINAL

(75) Inventor: Taketoshi Arakawa, Yokohama (JP)

(73) Assignee: Hitachi, Ltd., Tokyo (JP)

(*) Notice: Subject to any disclaimer, the term of this patent is extended or adjusted under 35 U.S.C. 154(b) by 443 days.

(21) Appl. No.: 13/301,411

(22) Filed: Nov. 21, 2011

(65) Prior Publication Data

US 2012/0140734 A1 Jun. 7, 2012

(30) Foreign Application Priority Data

Dec. 3, 2010 (JP) ................................. 2010-270299

(51) Int. Cl.
*H04W 80/04* (2009.01)
*H04W 36/18* (2009.01)
*H04L 12/66* (2006.01)

(52) U.S. Cl.
CPC .............. *H04W 80/04* (2013.01); *H04W 36/18* (2013.01); *H04L 12/66* (2013.01)
USPC ........... 370/331; 370/329; 370/328; 370/400; 455/437

(58) Field of Classification Search
CPC ..... H04W 80/04; H04W 36/18; H04W 36/14; H04L 12/66; H04L 45/02
USPC ................. 370/331, 329, 328, 320, 400, 401; 455/437
See application file for complete search history.

(56) References Cited

U.S. PATENT DOCUMENTS

| 6,263,384 | B1 * | 7/2001 | Yanase ............................ 710/53 |
| 2009/0016300 | A1 | 1/2009 | Ahmavaara et al. |
| 2010/0062773 | A1 * | 3/2010 | Yokota ........................... 455/437 |
| 2010/0215019 | A1 * | 8/2010 | Velev et al. ................... 370/331 |

FOREIGN PATENT DOCUMENTS

| JP | 2002-271436 A | 9/2002 |
| JP | 2008-236079 | 10/2008 |
| JP | 2009-049875 | 3/2009 |
| JP | 2010-531116 A | 9/2010 |

* cited by examiner

*Primary Examiner* — Ian N Moore
*Assistant Examiner* — Hien Nguyen
(74) *Attorney, Agent, or Firm* — Foley & Lardner LLP

(57) ABSTRACT

There is provided a hybrid communication terminal which can overcome a drawback that, in performing switching a system between a 3G network and a WiMAX/LTE is performed under control of a mobile unit, when an IP address allocated to a mobile unit from the network differs before and after system switching, an active session of communication application is disconnected so that it is impossible to continue the communication. In automatically switching connection between different systems during communication, in order to conceal from the communication application that an IP address assigned by the network is changed, an exchange of user data with the communication network is performed via a virtual network device where the IP address is always the same.

1 Claim, 16 Drawing Sheets

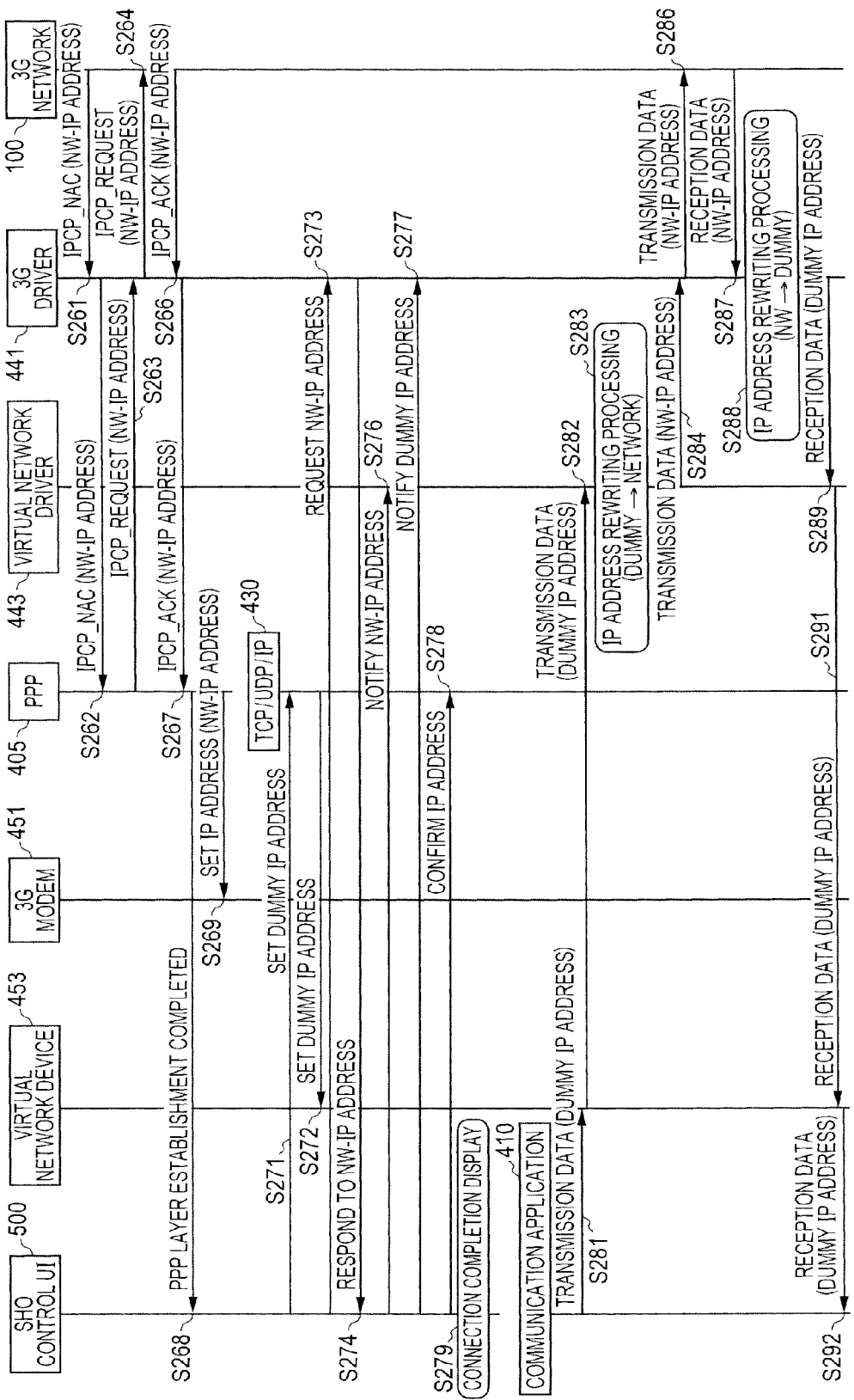

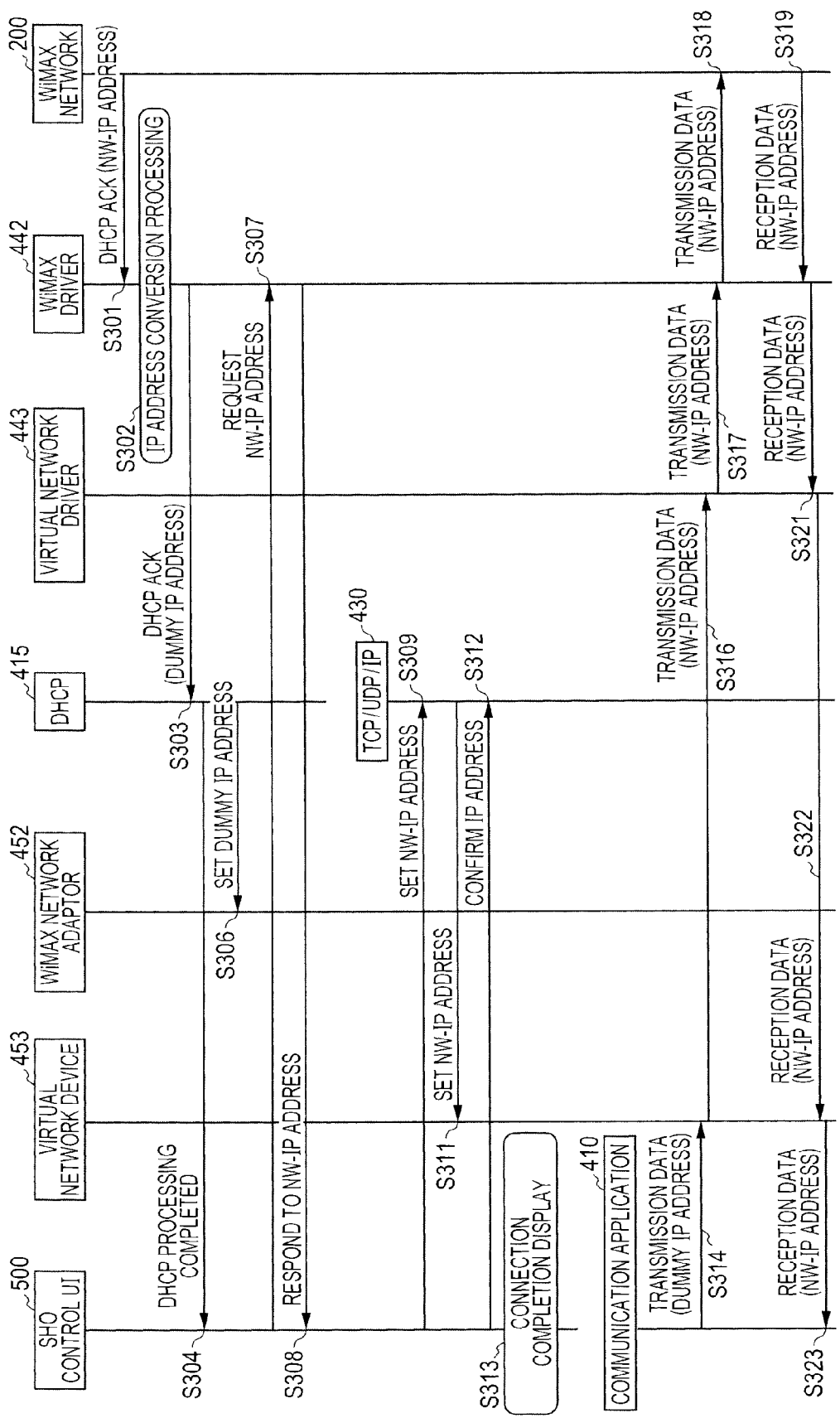

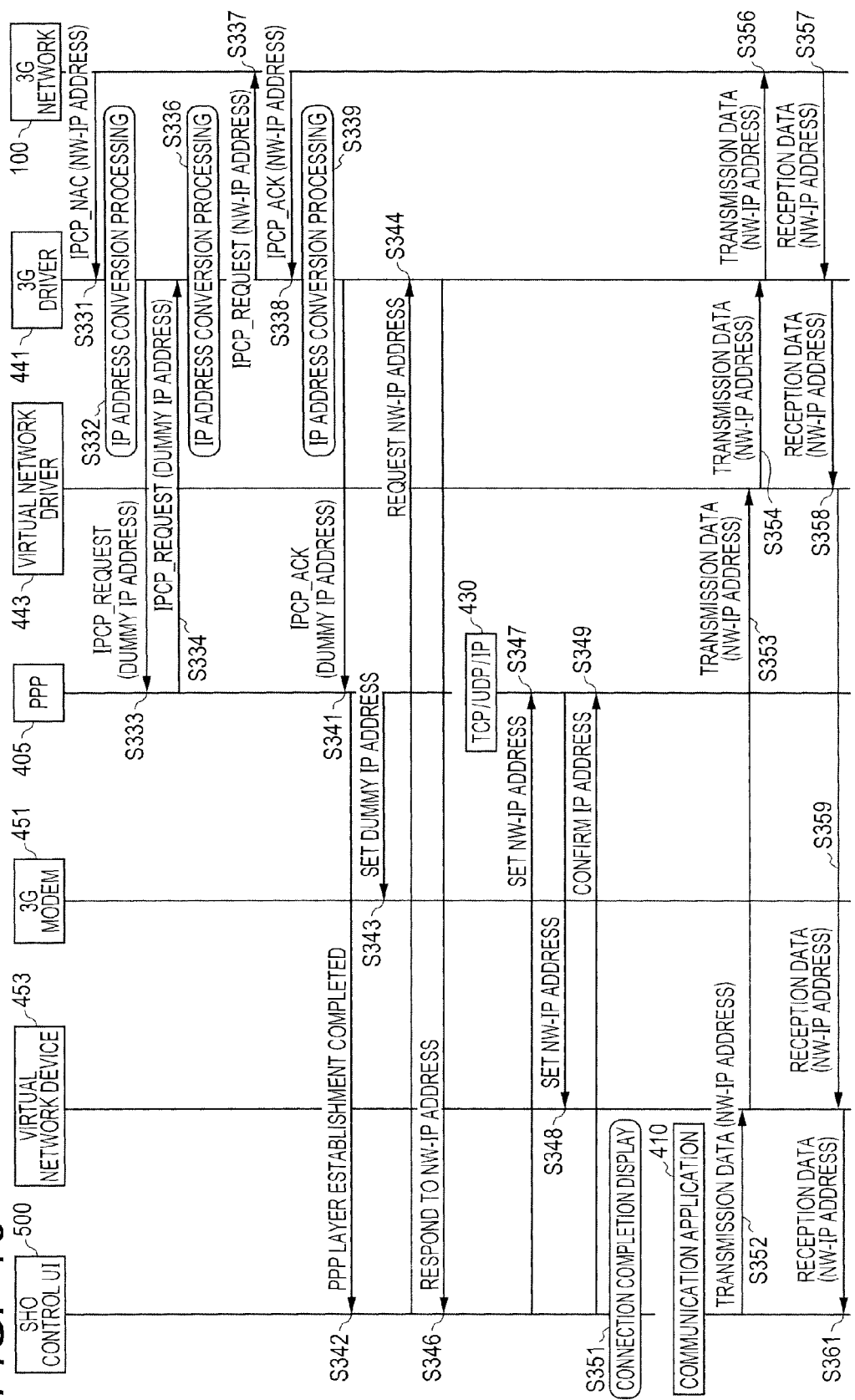

HYBRID COMMUNICATION TERMINAL

CLAIM OF PRIORITY

The present application claims priority from Japanese patent application serial no. 2010-270299, filed on Dec. 3, 2010, the content of which is hereby incorporated by reference into this application.

BACKGROUND OF THE INVENTION

The present invention relates to a hybrid communication terminal which is connected to a computer, and more particularly to a hybrid communication terminal which receives the supply of power from the computer and can perform the handover while continuing the communication.

As a mobile communication system, there has been known a broadband mobile service which is based on an existing mobile network such as a High Speed Packet Access (HSPA) and 1xEVDO which are regarded as technology of 3G, particularly 3.5G of recent years. Further, an environment has been created where a user can make use of various networks which includes novel broadband mobile services such as WiMAX which is regarded as the next generation technology which realizes the wider broadband communication and LTE which will soon commercially available.

For this end, user contents are no longer limited to voice communication services, a mobile body dedicated internet with small capacity for mobile and an exchange of e-mails. That is, WiMAX and LTE allow users to sufficiently make use of broadband contents represented by motion picture streaming even under a mobile environment even when the lowering of a communication speed generated by a Doppler effect which occurs when the moving body moves at a high speed is taken into consideration. Further, with the advent of a low latency network represented by LTE, an environment where a VOIP service becomes fully available at a portable terminal has been created.

WiMAX and LTE which are novel broadband mobile services are excellent in high speed property compared to the 3G network which uses an existing mobile body network as a base. On the other hand, WiMAX and LTE are provided in a spotted manner with respect to service areas in an initial stage of practice. As a result, there is not yet provided a situation where WiMAX or LTE can be used in a single form anywhere and any place. Accordingly, a need has been increasing for a terminal which can automatically switch a communication mode in such a manner that the communication using WiMAX or LTE is conducted in an environment where WiMAX or LTE is available, and an existing 3G network having a wide service area is conducted in an area outside ranges of these high speed networks.

Further, in the connection switching between the 3G network and WiMAX/LTE, the maintenance of the continuity of communication is an important requisite in terms of providing services not only at the time of using VOIP but also at the time of using contents where data are continuously exchanged such as streaming service. Assuming a case where the connection switching between the existing network and WiMAX/LTE is possible in a situation where the continuity of communication is not maintained, the contents which a user can use are limited eventually. This becomes an obstacle for a communication provider and an Application Service Provider (ASP) who provide various and versatile services and hence, there has been a strong demand for the maintenance of the continuity of communication at the time of switching the network.

The technique disclosed in JP-A-2008-236079 can perform the communication of the same data simultaneously between a communication terminal provided with a Media Independent Handover (MIH) function and two different network systems. The communication terminal starts the connection with the first network, and monitors radio communication quality between the communication terminal and the first network. The communication terminal, when a monitor result is lower than a preset threshold value of radio communication quality, performs the connection with the second network. The communication terminal starts communication between the communication terminal and the second network using data equal to data used between the communication terminal and the first network. The communication terminal monitors a radio communication quality state between the communication terminal and the second network in the same manner. The communication terminal, when it is confirmed that the communication can be performed with radio communication quality between the communication terminal and the second network exceeding a certain threshold value, disconnects the connection with the first network so that the handover is executed.

In JP-A-2009-049875, a communication terminal performs communication simultaneously with two different networks or with either one of these networks which is communicable. The communication terminal connects with the first network and acquires information such as communication quality between the communication terminal and the first network, power consumption when the communication is performed between the communication terminal and the first network, a communication speed between the communication terminal and the first network, and communication application to be used. In the same manner, the communication terminal can also acquire the similar information between the communication terminal and the second network. The communication terminal uses these monitor values as parameters of handover, and selects the network on a side where power saving can be realized within a range where communication application to be used can be used without troubles. That is, the communication terminal executes a new connection or the handover with the side where power saving can be realized.

<Task to be Solved in Suppressing the Increasing of Cost and in Enabling Early Start of Providing Services in Mounting Functions Under Control of Network>

A conventional handover system between different networks requires dedicated facility for realizing a handover which maintains the continuity of communication not only on a communication terminal but also on respective network sides.

The communication terminal requires a dedicated circuit and software for controlling switching networks. On the other hand, the networks require the provision of a dedicated facility in respective network systems. Accordingly, the initial facility investment necessary for a telecommunication provider is increased leading to a high cost.

Further, to realize the handover which maintains the continuity of communication, with respect to a dedicated facility which is added to a network, it is necessary to take into account easiness of future system migration, roaming or the like. For this ends, generally used is a dedicated facility which supports a method fixed by the standards organization, to be more specific, 3GPP and 3GPP2 in the case of 3G network or LTE, and IEEE and WiMAX forum in case of WiMAX. However, it takes time for review before these standards organizations fix the handover specification between WiMAX or LTE and the existing network. Accordingly, the telecommunication provider faces an obstacle in a handover service between the WiMAX or LTE and a 3G network from the beginning of providing services using WiMAX or LTE in a single form.

With respect to WiMAX and LTE, at the time of starting providing services, a service area is narrow. Accordingly, in general, adopted is a method where the propagation of the service is promoted by maintaining the continuity of communication with the existing network. However, there arises a drawback that the maintenance of the continuity of communication cannot be acquired in an early stage.

<Task to be Solved for Realizing Maintenance of Continuity of Communication>

In performing switching of the system between 3G network and WiMAX/LTE during communication under control of a mobile unit, on a network system where there is totally no exchange between both networks, an IP address before switching of the system and an IP address after switching of the system differ from each other. Accordingly, a change of an IP address is detected by an OS of a posterior terminal (communication terminal to which the mobile unit is connected) such as a PC resulting in the disconnection of active session of communication application.

Even when an interwork is provided between both networks so that the communication is performed on a network system where an IP address is not changed before and after system switching, it is impossible to register two same IP addresses on a PC at system switching timing from a viewpoint of an IP network system. Accordingly, there is timing where IP address is not present before and after system switching. When the communication application performs the exchange of data at this timing, an active session of the communication application is disconnected in the same manner as the above-mentioned task.

<Technique Disclosed in Prior Art Document>

JP-A-2008-236079 discloses the invention relating to a handover method which uses an MIH technique. Usually, to realize the maintenance of the continuity of communication at the time of switching the system in the network system which uses the MIH through an MIH technique, an agent server of the MIH is arranged on a network side. In general, the management of a session including IP addresses of different network systems is controlled on a network side using the agent server of the MIH.

JP-A-2008-236079 completely fails to disclose a method where an IP address is relayed under control of a terminal side. JP-A-2008-236079 also does not refer to as an MIH server. However, it is at least considered that JP-A-2008-236079 discloses a technique which depends on a network side function with respect to the maintenance of continuity of communication at the time of switching the system between the 3G network and the WiMAX/LTE.

JP-A-2008-236079 also discloses an example where a hand-set-type mobile unit is used. In this case, a collective control can be performed on a mobile unit side including the management of an IP session and the management of communication application. Even when an IP address is changed or timing at which IP address is not present at system switching timing, the control of communication application by concealing such a state can be performed relatively easily because of a closed platform. On the other hand, in a case such as a mobile data card where the continuity of communication at the time of switching the system is maintained using a function provided on a platform under an environment of an independent open platform such as a PC, it is necessary to conceal a change of an IP address or the presence of timing at which there is no IP address in the OS or the communication application. However, in JP-A-2008-236079, there is no description corresponding to these techniques.

In JP-A-2009-049875, when the connection terminal is connected to the different kinds of networks, power consumptions, throughputs and the like of the respective networks are measured, and the switching to the different kinds of system is performed by taking into account the characteristic of application to be used and also the power consumption. However, in the same manner as JP-A-2008-236079, in JP-A-2009-049875, there is no description on the constitution which maintains the continuity of communication at the time of switching the system under control of the terminal.

SUMMARY OF THE INVENTION

To overcome the above-mentioned drawbacks, according to the present invention, communication application always performs communication through a virtual network device where an IP address is fixed thus realizing the maintenance of the continuity of communication.

To be more specific, when an inter-system Hand Over (HO) control user interface receives a connection request from a user, the user interface confirms a radio environment or the like of a network where the user sets priority connection, and transmits a connection request to a network device corresponding to a first network corresponding to a priority network when the connection request exceeds a certain threshold value, and the network device corresponding to the first network which has received the request requests connection processing to a mobile unit through a device driver corresponding to the first network, the mobile unit and the first network execute connection processing, and when all processing are normally completed, an IP address is assigned to the mobile unit by a Home Agent (HA) connected to the first network.

Next, with respect to the allocation of the IP address, under an environment where the IP address is changed before and after switching of the network, an IP address allocated from the network is set in the network device which is actually connected to the first network in a final step of the above-mentioned connection processing with the first network.

Next, a dummy IP address is set in a virtual network device which performs data communication with a communication application through the inter-system HO control user interface. At this point of time, the connection of the mobile unit with the first network is completed so that the communication application can perform the communication through the mobile unit.

Next, with respect to the exchange of the user data, the first network expects that an IP packet where an IP address allocated by the HA is set to a source IP address reaches from the mobile unit, and the communication application can also perform the communication when an IP packet where an IP address of a virtual network device with which the communication application actually performs an exchange is set to an target IP address reaches the communication application.

Accordingly, the virtual network device substitutes a source IP address in the IP packet transmitted from the communication application with the IP address allocated from the first network, and transfers the IP packet to the device driver corresponding to the first network.

When the IP address transmitted from the first network reaches the device driver corresponding to the first network, a Target IP address of the IP packet is rewritten with a dummy IP address allocated to the virtual network device, and the dummy IP address is transferred to a virtual network device driver, and the data reaches the communication application.

Next, at the time of performing switching between the first network and the second network, an IP address allocated from the second network is not allocated to virtual network device which actually transacts with the communication application but is allocated to a network device which corresponds to a posterior second network and hence, a change of the IP address cannot be recognized from the communication application. As a result, the continuity of communication at the time of switching the system can be maintained.

On the other hand, in an environment where an IP address is not changed before and after switching the network, the continuity of communication at the time of switching the system can be maintained also by a method where a dummy IP address is set in the network device which is actually connected to the first network, and an IP address allocated by the first network is set in the virtual network device which performs the data communication with the communication application.

In this case, when the first network is a 3G network and also is a modem, the acquisition of an IP address is performed within Internet Protocol Control Protocol (IPCP) processing in the PPP authentication. In this processing, the driver corresponding to the first network converts an IP address which is allocated from the first network into a dummy IP address, and transmits the dummy IP address to a PPP in the OS and hence, the dummy IP address is set in the first network device.

Next, inter-system handover control user interface reads an IP address which is actually allocated from the first network from a driver corresponding to the first network and, thereafter, sets the IP address in the virtual network device. At this point of time, the connection processing of the mobile unit with the first network is completed so that the communication application can perform communication through the mobile unit.

Next, with respect to the exchange of the user data, in this method, an IP address allocated from the first network is set in the virtual network device which performs exchange of data with the communication application. Accordingly, the IP address allocated from the first network is set as a source IP address of an IP packet which reaches the first network from the communication application, and an IP address of the virtual network device is set as a Target IP address of an IP packet which reaches the virtual network device from the first network and hence, substitution processing of an IP address during communication is unnecessary.

Next, at the time of switching the network between the first network and the second network, when the second network is WiMAX, the acquisition of an IP address is performed in Dynamic Host Configuration Protocol (DHCP) processing. Here, the driver corresponding to the second network converts an IP address allocated from the second network into a dummy IP address, and transmits the dummy IP address to the DHCP in the OS so that the dummy IP address is set in the network device corresponding to the second network.

Next, the inter-system handover control user interface reads an IP address actually allocated from the second network from the driver corresponding to the second network, and confirms that the IP address allocated from the first network and the IP address allocated from the second network are not changed so that switching of the network is completed.

Also with respect to the exchange of the user data after switching the system, the IP address allocated from the first network is set in the virtual network device which performs the exchange of data with the communication application. Accordingly, the IP address allocated from the first network is set as a source IP address of an IP packet which reaches the first network from the communication application, and the IP address of the virtual network device is set as the Target IP address of the IP packet which reaches the virtual network device from the first network and hence, the substitution processing of the IP address during communication is unnecessary.

Accordingly, also in this IP address substitution processing, the IP address of the virtual network device which performs the exchange of data with the communication application is not changed at system switching timing and hence, the continuity of communication at the time of switching the system can be maintained under control of the terminal.

Accordingly, assuming that an end user side facility is constituted of: the inter-system handover control user interface; the Hybrid communication terminal which is independently communicable with two or more kinds of networks; the device driver corresponding to the first network represented by the 3G network; the device driver corresponding to the second network represented by the WiMAX/LTE; and the virtual network device which plays a role of transferring data between the communication application and the device drivers corresponding to the respective network systems during data communication, all of which are mounted in the inside of the PC, using only such an end user side facility, then the communication terminal is automatically connected to the network in a non-connection state when it is determined that radio communication quality of one of the communication terminal and the network which is used is insufficient to maintain the current connection while the communication terminal is connected with one of the different networks. The function which can ensure the maintenance of continuity of communication at the time of switching the network can also be realized. Accordingly, it is possible to provide services without requiring the installation of a dedicated facility to the respective networks or with the installation of a minimum scale of the dedicated facility. Accordingly, the increase of cost in providing functions under control of networks can be prevented. Further, services can be provided sooner.

The maintenance of continuity of communication under control of a mobile unit side can be realized so that it is unnecessary to additionally install a dedicated facility to both networks or a scale of the dedicated facility can be minimized. Accordingly, a burden imposed on a telecommunication provider due to the introduction of facility can be reduced.

Further, even when user data in real time is generated at system switching timing, it is necessary to conceal a change of an IP address or the presence of timing at which there is no IP address for a fixed time from the communication application. As a result, the session of the communication application is not disconnected. Accordingly, both an end user and a telecommunication provider can make use of various and versatile services.

BRIEF DESCRIPTION OF THE DRAWINGS

Preferred embodiments of the present invention will now be described in conjunction with the accompanying drawings, in which;

FIG. 14 is a sequence diagram for explaining the IP address substitution at the time of newly connecting the communication terminal to the 3G network or at the time of switching the connection to the 3G network during communication with the WiMAX network (a case where an IP address is changed before and after switching the system);

FIG. 15 is a sequence diagram for explaining the IP address substitution at the time of newly connecting the communication terminal to the WiMAX network or at the time of switching the connection to the WiMAX network during communication with the 3G network (a case where an IP address is not changed before and after switching the system); and FIG. 16 is a sequence diagram for explaining the IP address substitution at the time of newly connecting the communication terminal to the 3G network or at the time of switching the connection to the 3G network during communication with the WiMAX network (a case where an IP address is not changed before and after switching the system).

DETAILED DESCRIPTION OF THE PREFERRED EMBODIMENTS

Hereinafter, embodiments will be explained in detail in conjunction with drawings. Parts which are substantially identical are given the same number and the explanation of the parts is not repeated. Further, although the explanation is made hereinafter using 3G and WiMAX as two kinds of radio networks, two kinds of radio networks are not limited to these networks.

Embodiment 1

Figure 1:
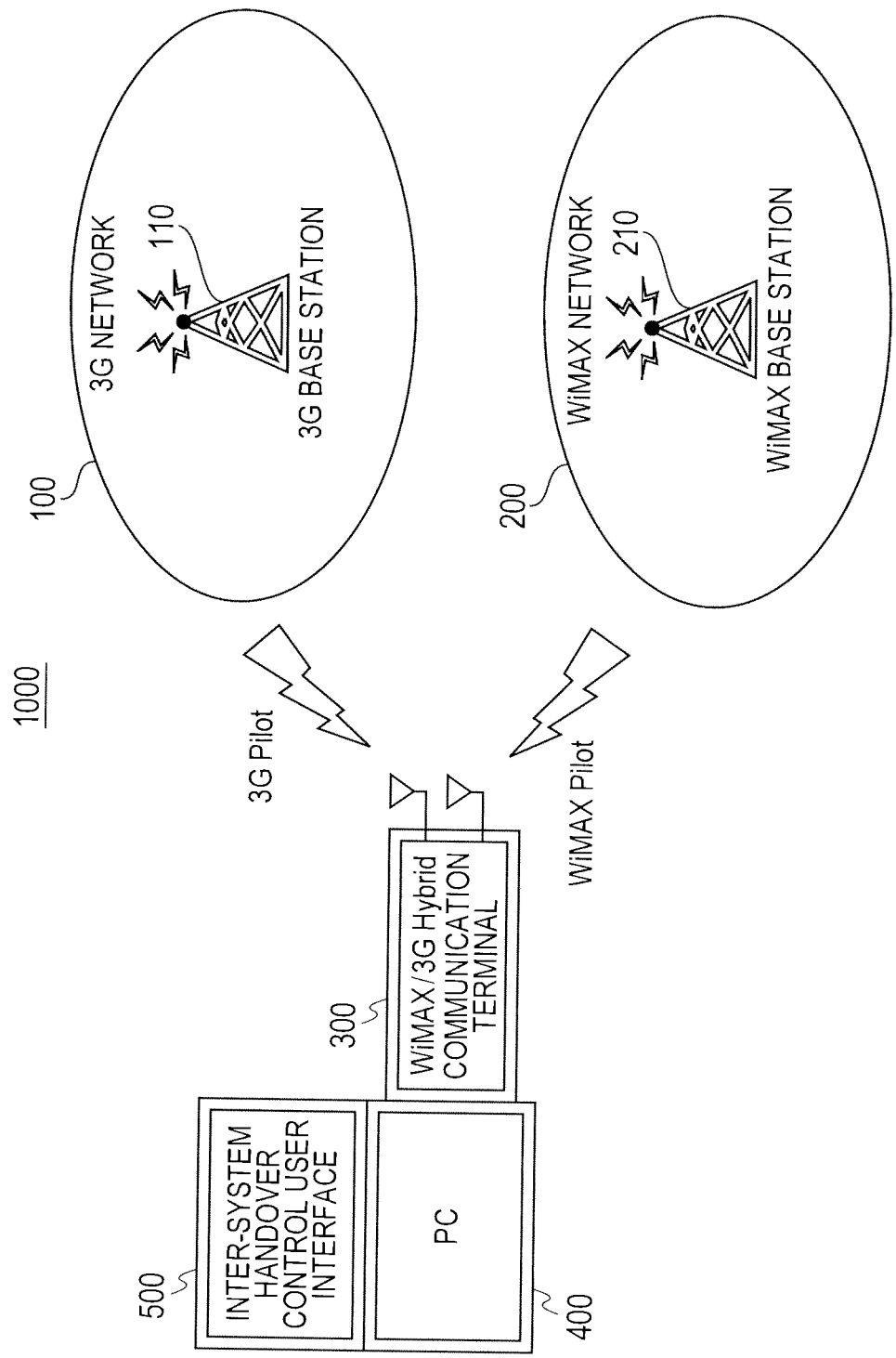
FIG. 1 is a block diagram of a radio network.

Firstly, the constitution of a radio network 1000 will be explained in conjunction with FIG. 1. In FIG. 1, the radio network 1000 is constituted of a WiMAX/3G_Hybrid communication terminal 300 connected to a Personal Computer (PC) 400, a 3G network 100, and a WiMAX network 200. When the WiMAX/3 G_Hybrid communication terminal 300 is connected to the PC 400 for the first time, the PC 400 performs the zero-installing of an inter-system handover control user interface 500. The 3G network 100 includes a 3G base station 110. The WiMAX network 200 includes a WiMAX base station 210.

Hereinafter, the WiMAX/3G_Hybrid communication terminal 300 is simply referred to as a Hybrid communication terminal 300. The inter-system handover control user interface 500 is also simply referred to as a control user interface 500. Due to such abbreviation, the increase of the volume of the description of specification can be prevented.

<Summary of Operation at the Time of Initial Communication Connection>

When the Hybrid communication terminal 300 is mounted on the PC 400, the Hybrid communication terminal 300 receives the supply of electricity from the PC 400. Upon receiving the supply of electricity, the Hybrid communication terminal 300 performs initial setting with the PC 400 so that the Hybrid communication terminal 300 is recognized as a network device corresponding to the 3G network 100 or a network device corresponding to the WiMAX network. A virtual network device is registered in the PC at the time of zero-installing the control user interface 500. The virtual network device is always recognized on the OS at the time of completion of starting the OS irrelevant to whether or not the Hybrid communication terminal 300 is connected to the PC 400.

The Hybrid communication terminal 300 receives an acquisition instruction of the priority connection network which a user set in the control user interface 500 in advance from the control user interface 500. The Hybrid communication terminal 300 is shifted to a standby state through the priority network when the Hybrid communication terminal 300 succeeds in the pilot acquisition of the priority network.

The control user interface 500, when the Hybrid communication terminal 300 is normally recognized by the PC 400 and the control user interface 500 receives a standby completion report of the priority network from the Hybrid communication terminal 300, performs a predetermined power control. Next, the control user interface 500 transmits a command requesting the Hybrid communication terminal 300 to periodically report a standby state of the Hybrid communication terminal 300 with the network which the Hybrid communication terminal 300 stands by and a radio state of the network which the Hybrid communication terminal 300 does not stand by. Thereafter, the control user interface 500 monitors radio states of the respective networks 100, 200 and a state between the Hybrid communication terminal 300 and the network which the Hybrid communication terminal 300 stands by in real time. The control user interface 500 controls the Hybrid communication terminal 300 in accordance with a priority connection mode which the user sets and waits for a connection instruction from the user.

When the priority network is out of a range, the control user interface 500 performs a predetermined power control and subsequently transmits an instruction to the Hybrid communication terminal 300 such that the Hybrid communication terminal 300 stands by the non-priority network.

When both networks are outside the range, the control user interface 500 performs a predetermined power control and subsequently transmits an instruction to the Hybrid communication terminal 300 such that the Hybrid communication terminal 300 periodically reports network radio states of both the WiMAX network 200 and the 3G network 100.

When the user performs a communication connection operation, the control user interface 500 applies a predetermined power control to the Hybrid communication terminal 300. Next, the control user interface 500 transmits an instruction to the Hybrid communication terminal 300 so that the Hybrid communication terminal 300 is connected to the network in a standby state.

The Hybrid communication terminal 300, upon receiving a connection instruction command from the control user interface 500, establishes a session of the network and a radio layer on a standby side. The Hybrid communication terminal 300 performs authentication processing by making use of a Point to Point Protocol (PPP) or a Dynamic Host Configuration Protocol (DHCP).

The control user interface 500, in a step of acquiring an IP address from the network, sets a predetermined network IP address or a dummy IP address in the network device corresponding to the network which the control user interface 500 is going to connect with and the virtual network device which directly performs data communication processing with the communication application. After confirming that the predetermined IP address is correctly set in the respective network devices, the control user interface 500 notifies the user of the completion of the connection. The dummy IP address is selected from private IP addresses. The dummy IP address may be also selected from an Automatic Private IP Addressing (APIPA) address.

A connection mode which a user sets in the control user interface 500 in advance is selected from a group consisting of a mode where the Hybrid communication terminal 300 is connected to the 3G network 100 with priority, a mode where the Hybrid communication terminal 300 is connected to the WiMAX network 200 with priority, and a mode where the Hybrid communication terminal 300 is connected to one of the 3G network 100 and the WiMAX network 200. However, the processing of the mode where the Hybrid communication terminal 300 is connected to one of the 3G network 100 and the WiMAX network 200 is not relevant to this embodiment and hence, the explanation of the processing of the mode is not explained.

<Operation at the Time of Handover>

Under following conditions the control user interface 500 starts switching processing from the network to which the Hybrid communication terminal 300 is currently connected to the network different from the currently connected network.

Condition 1. The Hybrid communication terminal 300 is currently connected to the priority network and the communication radio quality of the currently connected network is degraded so that the condition for starting the execution of the handover is satisfied.

Condition 2. The Hybrid communication terminal 300 is currently connected to the non-priority network and a state of the network is in a non-communication state so that the Hybrid communication terminal 300 is a standby state.

To prevent the inter-system handover from falling into an infinite loop, when the handover from the non-priority network to the priority network is made, the handover during communication is not performed, and switching processing to the priority network is started in response to a shift of state of the non-priority network to a non-communication state so that the Hybrid communication terminal 300 is brought into a standby state.

The Hybrid communication terminal 300, upon receiving an instruction from the control user interface 500, reports the radio communication quality information of the WiMAX network 200 or the 3G network 100 which is the handover transmission destination to the control user interface 500.

The control user interface 500 determines whether or not the received radio communication quality satisfies the condition for starting the handover. When the control user interface 500 determines that the received radio communication quality satisfies the condition for starting the handover, the control user interface 500 transmits a handover execution command to the Hybrid communication terminal 300.

The Hybrid communication terminal 300, upon receiving a handover execution command, establishes the connection of the Hybrid communication terminal 300 with the WiMAX network 200 or the 3G network 100. The Hybrid communication terminal 300 notifies the control user interface 500 of the completion of predetermined IP address substitution processing.

The control user interface 500, upon receiving, from the Hybrid communication terminal 300, a report on the completion of connection with the network which is the handover transmission source, transmits a request for clearing the information on session with the WiMAX network 200 or the 3G network 100 which is the handover transmission source to the Hybrid communication terminal 300. The control user interface 500 displays that the connection network is changed on a user interface 510 thereof. The control user interface 500 continues monitoring of a state of the network under communication connection.

When the connection is not established, the Hybrid communication terminal 300 tries the reconnection with the WiMAX network 200 or the 3G network 100 which is the handover transmission source and continues the communication when the Hybrid communication terminal 300 is succeeded in the reconnection. When the Hybrid communication terminal 300 fails in the reconnection, the Hybrid communication terminal 300 readily performs standby processing with the priority network. When the standby processing is completed, the control user interface 500 displays a state indicative of the completion of the standby state to a user.

The constitution of the Hybrid communication terminal 300 and the PC 400 will be explained in conjunction with FIG. 2. The Hybrid communication terminal 300 is constituted of a HUB 310, a 3G function part 320, and a WiMAX function part 330. The 3G function part 320 is constituted of a 3G power source management part 321, a 3G memory part 322, a 3G posterior IF control part 323, a 3G supervisory control part 324, a 3G modem part 325, a 3G RF band part 326, and a 3G antenna 327. The WiMAX function part 330 is constituted of a WiMAX power source management part 331, a WiMAX memory part 332, a WiMAX posterior IF control part 333, a WiMAX supervisory control part 334, a WiMAX modem part 335, a WiMAX RF band part 336, and a WiMAX antenna 337.

The HUB 310 connects the 3G function part 320 and the WiMAX function part 330 to the PC 400.

The 3G supervisory control part 324, the 3G modem part 325 and the 3G RF band part 326 of the 3G function part 320 are divided into a transmission part and a reception part, and the supply of electricity to the respective parts is individually controlled by the power management part 321.

In the same manner, the WiMAX supervisory control part 334, the WiMAX modem part 335, and the WiMAX RF band part 336 of the WiMAX function part 330 are divided into a transmission part and a reception part, and the supply of electricity to the respective parts is individually controlled by the power management part 331.

The PC 400 is constituted of a USB IF part 460, a CPU 465, a memory 470, a display part 475, a hard disc 480, an operation part 485, and an internal communication line 490 which connects these parts.

Figure 3:
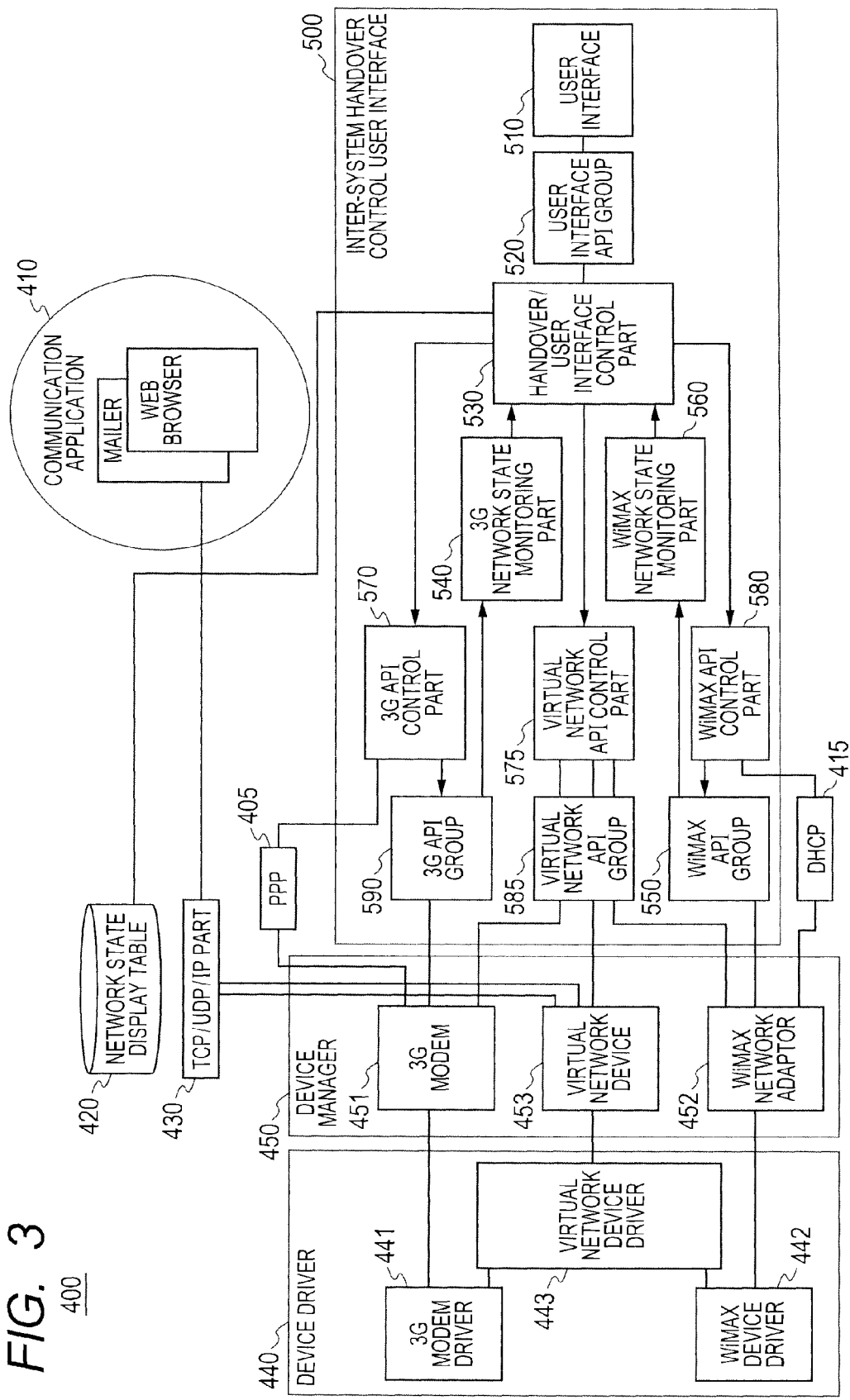
FIG. 3 is a functional block diagram of the PC.

Function blocks of the PC 400 will be explained in conjunction with FIG. 3. In FIG. 3, the PC 400 is constituted of a communication application 410 (to be more specific, an internet browser and a mailer), a connection network state display table 420, a TCP/UDP/IP part 430, a device driver 440, a device manager 450, the inter-system handover control user interface 500, a PPP 405, and a DHCP 415.

The device driver 440 is constituted of a WiMAX device driver 442, and a virtual network device driver 443.

The device manager 450 is constituted of a 3G modem 451, a WiMAX network adaptor 452, and a virtual network device 453.

The inter-system handover control user interface 500 is constituted of a user interface 510, a user interface Application Program interface (API) group 520, a handover/user interface control part 530, a 3G network state monitoring part 540, a WiMAX network state monitoring part 560, a 3G API control part 570, a WiMAX API control part 580, an virtual network API control part 575, a 3G API group 590, a WiMAX API group 550, and a virtual network API group 585.

The device manager 450 recognizes the 3G function part 320 as a modem and recognizes the WiMAX function part 330 as a network adaptor based on a communication connection mode of the 3G function part 320 and a communication connection mode of the WiMAX function part 330. The virtual network device 453 which actually performs communication with the communication application 410 is recognized as a network adaptor. Here, when the Hybrid communication terminal 300 terminates PPP, the 3G function part 320 can be recognized as a network adaptor.

Here, the virtual network driver 443 which performs actual processing under control of the virtual network device includes a 3G modem driver 441 which performs actual processing under control of the 3G modem 320, a WiMAX device driver 442 which performs actual processing under control of the WiMAX network adaptor 452, and an interface which performs the transfer of user data.

The user interface 510 which a user operates notifies a connection/disconnection request from the user to the handover/user interface control part 530. The user interface 510 displays a result of determination whether or not the communication connection is allowed in response to the request, a state of the WiMAX network 200 and a state of the 3G network 100, and various set contents. The user interface 510 performs change setting of the various set contents. Individual functions of the user interface 510 correspond to the respective API of the user interface API group 520.

The handover/user interface control part 530 has an interface function of connecting the user interface API group 520 with the 3G API group 590, the WiMAX API group 550, and the virtual network API group. The handover/user interface control part 530 decides the execution of handover. The handover/user interface control part 530 determines the network to which the Hybrid communication terminal 300 is to be connected at the time of newly connecting the Hybrid communication terminal 300 or a route along which the Hybrid communication terminal 300 is to be controlled at the time of performing actual connection/disconnection processing, during data communication or at the time of switching the system.

The 3G network state monitoring part 540 monitors radio communication qualities of the respective systems and a state (connection/disconnection/standby/under Pilot acquisition or the like) of the 3G function part 320 based on response messages from the 3G API group 590. When a state is changed, the 3G network state monitoring part 540 notifies the handover/user interface control part 530 of the change.

The WiMAX network state monitoring part 560 monitors radio communication qualities of respective systems and a state (connection, disconnection, standby, pilot acquisition or the like) of the WiMAX function part 330 based on response messages from the WiMAX API group 550. When the state changes, the WiMAX network state monitoring part 560 notifies the handover/user interface control part 530 of the change.

The 3G API control part 570 executes the 3G API group 590 based on a command from the handover/user interface control part 530. As a result, the 3G API control part 570 controls the 3G function part 320.

The WiMAX API control part 580 executes the WiMAX API group 550 based on a command from the handover/user interface control part 530. As a result, the WiMAX API control part 580 controls the WiMAX function part 330.

The virtual network API control part 575 executes the virtual network API group 550 based on a command from the handover/user interface control part 530. As a result, the virtual network API control part 575 executes IP address substitution processing between the 3G modem 451 and the virtual network device 453. The virtual network API control part 575 executes IP address substitution processing between the WiMAX network adaptor 452 and the virtual network device 453. The virtual network API control part 575 executes a user data transfer control between the 3G modem 451 and the virtual network device 453. The virtual network API control part 575 executes a user data control transfer control between the WiMAX network adaptor 452 and the virtual network device 453.

Figure 2:
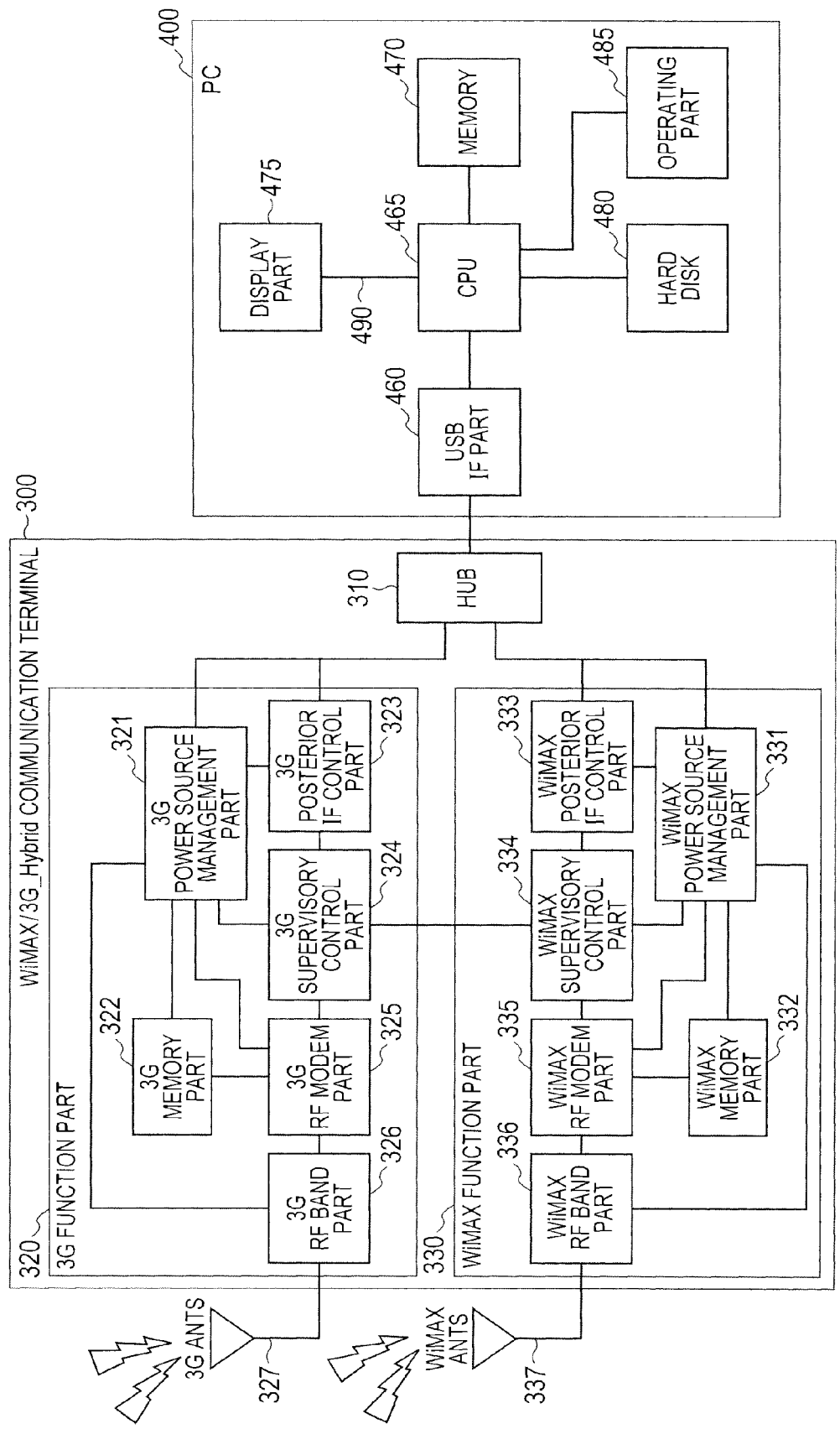
FIG. 2 is a functional block diagram of a Hybrid communication terminal and also is a hardware block diagram of a PC.

As can be understood from a comparison between the block diagram shown in FIG. 2 and the block diagram shown in FIG. 3, the device driver 440, the device manager 450 and the inter-system handover control user interface 500 realizes programs on the memory 470 as the CPU 465 executes the program.

Figure 4:
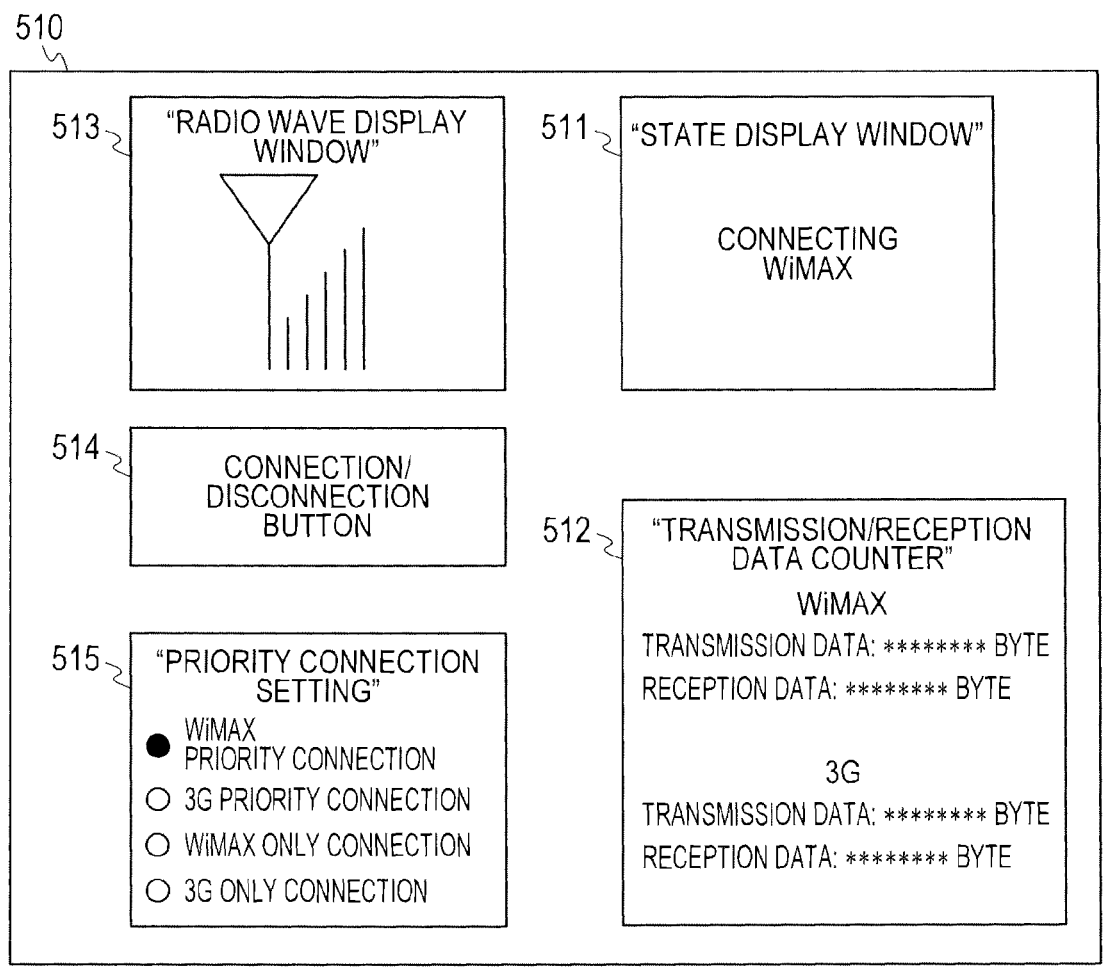
FIG. 4 is a view showing a GUI screen of a user interface.

A GUI screen of the user interface 510 will be explained in conjunction with FIG. 4. As shown in FIG. 4, the user interface 510 is constituted of a state display window 511, a transmission/reception data counter 512, a radio wave display window 513, a connection/disconnection button 514, and priority connection setting part 515.

The state display window 511 is a window for showing which network is in a standby state or in the midst of connection. The transmission/reception data counter 512 is a window which shows transmission/reception amounts of respective data communicated among the WiMAX network 200, the 3G network 100 and the WiMAX/3G handover corresponding terminal 300. The radio wave display window 513 displays communication radio quality of the WiMAX network 200 or the 3G network 100 during a standby state or a connection state. The connection/disconnection button 514 is a button which controls connection and disconnection of the WiMAX network 200 or the 3G network 100. The priority connection setting part 515 can set a mode where the terminal 300 is connected to the WiMAX with priority, a mode where the terminal 300 is connected to the 3G with priority, a mode where the terminal 300 is connected to only the WiMAX, or a mode where the terminal 300 is connected to only the 3G.

All of these functions correspond to the respective API of the user interface API group 520 in a one-to-one basis.

Next, the flow of data during the connection processing and the flow of data during date communication will be explained in conjunction with FIG. 5 to FIG. 8.

<Flow of Data at the Time of Standing by 3G Network or at the Time of Connecting Terminal to 3G Network>

Figure 5:
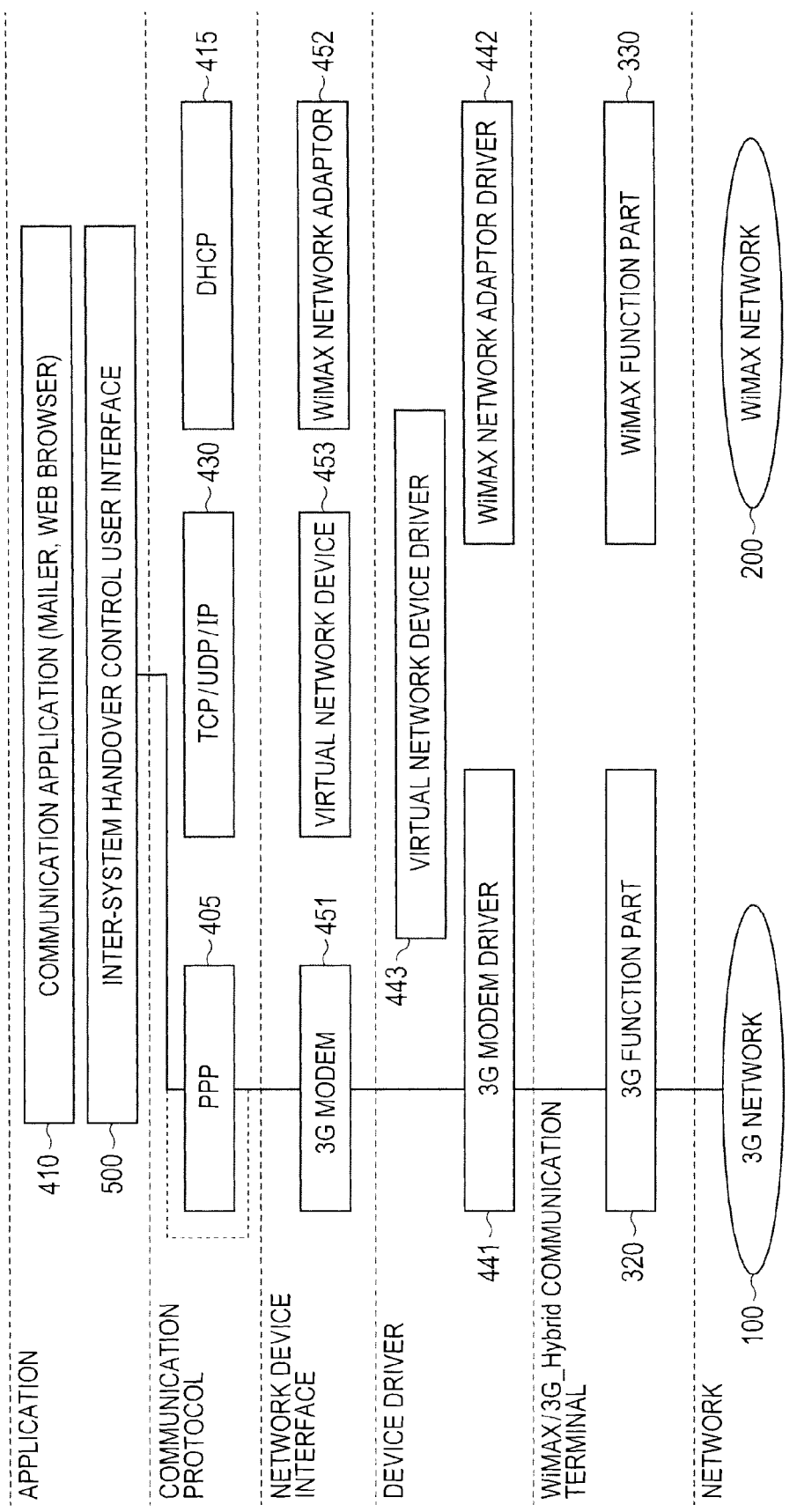
FIG. 5 is a functional block diagram showing the flow of data at the time of performing connection processing to a 3G network and at a standby time.

The flow of data at the time of standing by 3G network 100 or at the time of connecting to 3G network 100 will be explained in conjunction with FIG. 5. In FIG. 5, a communication application 410 and an inter-system handover control user interface 500 are positioned in an application layer. A PPP 405, a TCP/UDP/IP 430 and a DHCP 415 are positioned in a communication protocol layer. A 3G modem 451, a virtual network device 453 and a WiMAX network adaptor 452 are positioned in a network device interface layer. A 3G modem driver 441, a WiMAX network adaptor driver 442 and a virtual network device driver 443 are positioned in a device driver layer. A 3G function part 320 and a WiMAX function part 330 are positioned in a WiMMAX_Hybrid communication terminal layer. A 3G network 100 and a WiMAX network 200 are positioned in a network layer.

In a standby state, the control interface 500 collects information network information including pilot radio intensity which is currently acquired by the 3G function part 320 through the 3G network 100 and standby state information by polling for every fixed cycle. The control interface 500 displays such a state on a user interface 510. This processing is only state acquisition processing and hence, this processing is controlled without via the PPP 405 (indicated by a broken line in FIG. 5).

Next, at the time of performing connection processing to the 3G network 100, the control interface 500 notifies the 3G function part 320 of a radio session establishment request via the 3G modem 451 and the 3G modem driver 441. Upon receiving the completion report of the radio session establishment, next, the control interface 500 controls the PPP 405 and notifies the PPP session establishment request. After receiving the completion report of the PPP session establishment request, the control interface 500 performs the IP address setting processing at the respective network devices. After this processing is all normally completed, the control interface 500 performs a connection completion display on the user interface 510.

<Flow of Data at the Time of Standing by WiMAX Network and at the Time of Performing Connection Processing to WiMAX Network>

Figure 6:
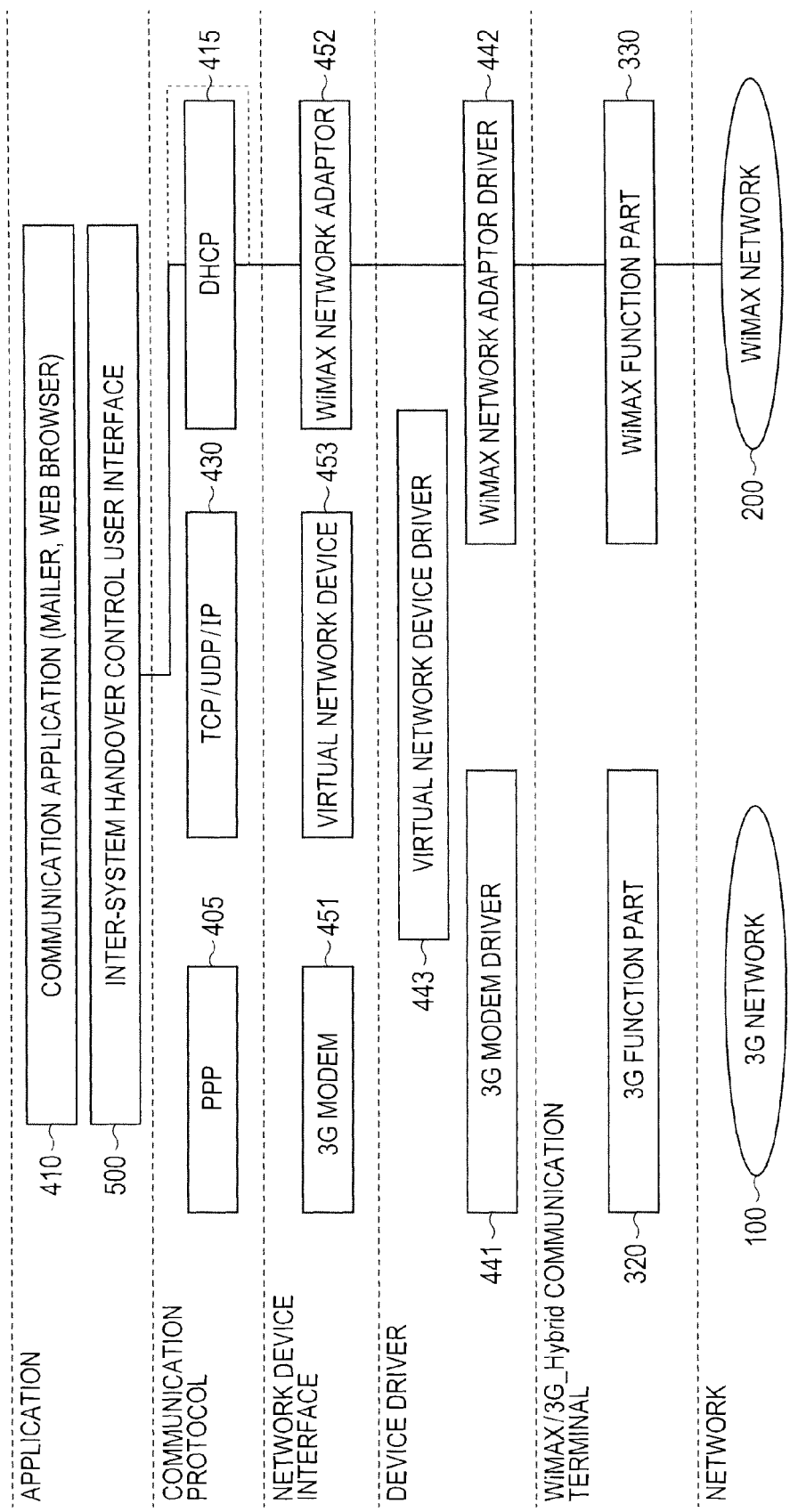
FIG. 6 is a functional block diagram showing the flow of data at the time of performing connection processing to a WiMAX network and at a standby time.

FIG. 6 shows the flow of data at the time of standing by the WiMAX network 200 and at the time of connection processing to WiMAX network 200.

In a standby state, the control interface 500 collects information network information including pilot radio intensity which is currently acquired by the WiMAX function part 300 through the WiMAX network 200 and standby state information by polling for every fixed cycle. The control interface 500 displays such a state on the user interface 510. This processing is only state acquisition processing and hence, this processing is controlled without via the DHCP 415 (indicated by a broken line in FIG. 6).

Next, at the time of performing connection processing to the WiMAX network 200, the control interface 500 notifies the WiMAX function part 330 of a radio session establishment request via WiMAX network adaptor 452 and the WiMAX network adaptor driver 442. Upon receiving the completion report of the radio session establishment, the control interface 500 notifies similarly the WiMAX function part 330 of an EAP session establishment request. Upon receiving the completion report of the EAP session establishment, the control interface 500 controls the DHCP 415, and performs IP address acquisition processing. Upon receiving the completion report of the IP address acquisition processing, the control interface 500 applies the IP address setting processing to the respective network devices. When this processing is normally completed, the control interface 500 performs a connection completion display on the user interface 510.

<Flow of Data During Communication Through 3G Network>

Figure 7:
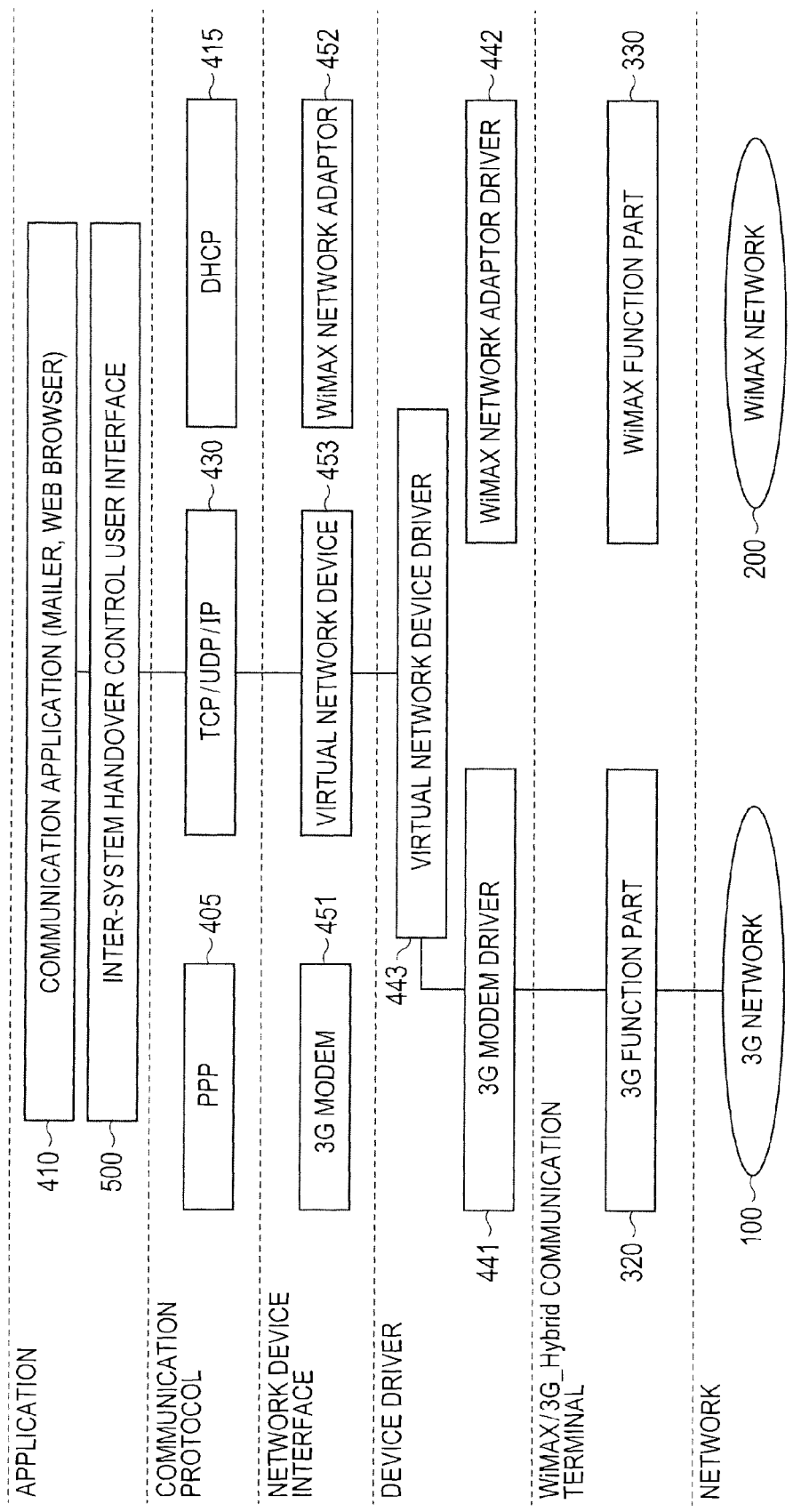
FIG. 7 is a functional block diagram showing the flow of data during communication with the 3G network.

FIG. 7 shows the flow of data in a state where the communication application 410 in the midst of communication with the 3G network 100. In FIG. 7, the virtual network device 453 transmits the user data from the communication application 410 to the virtual network device 443. The virtual network device 443 transfers the user data to the 3G modem driver 441 during communication connection. Accordingly, the user data can be transferred to the 3G network 100 during communication connection via the 3G function part 320.

Next, a 3G modem driver 441 receives data from the 3G network 100 via the 3G function part 320. The 3G modem driver 441 transfers the data to the virtual network device 443. Accordingly, the data from the 3G network 100 can be transferred to the communication application 410 via the virtual network device 453.

<Flow of Data in the Midst of Communication Through WiMAX Network>

Figure 8:
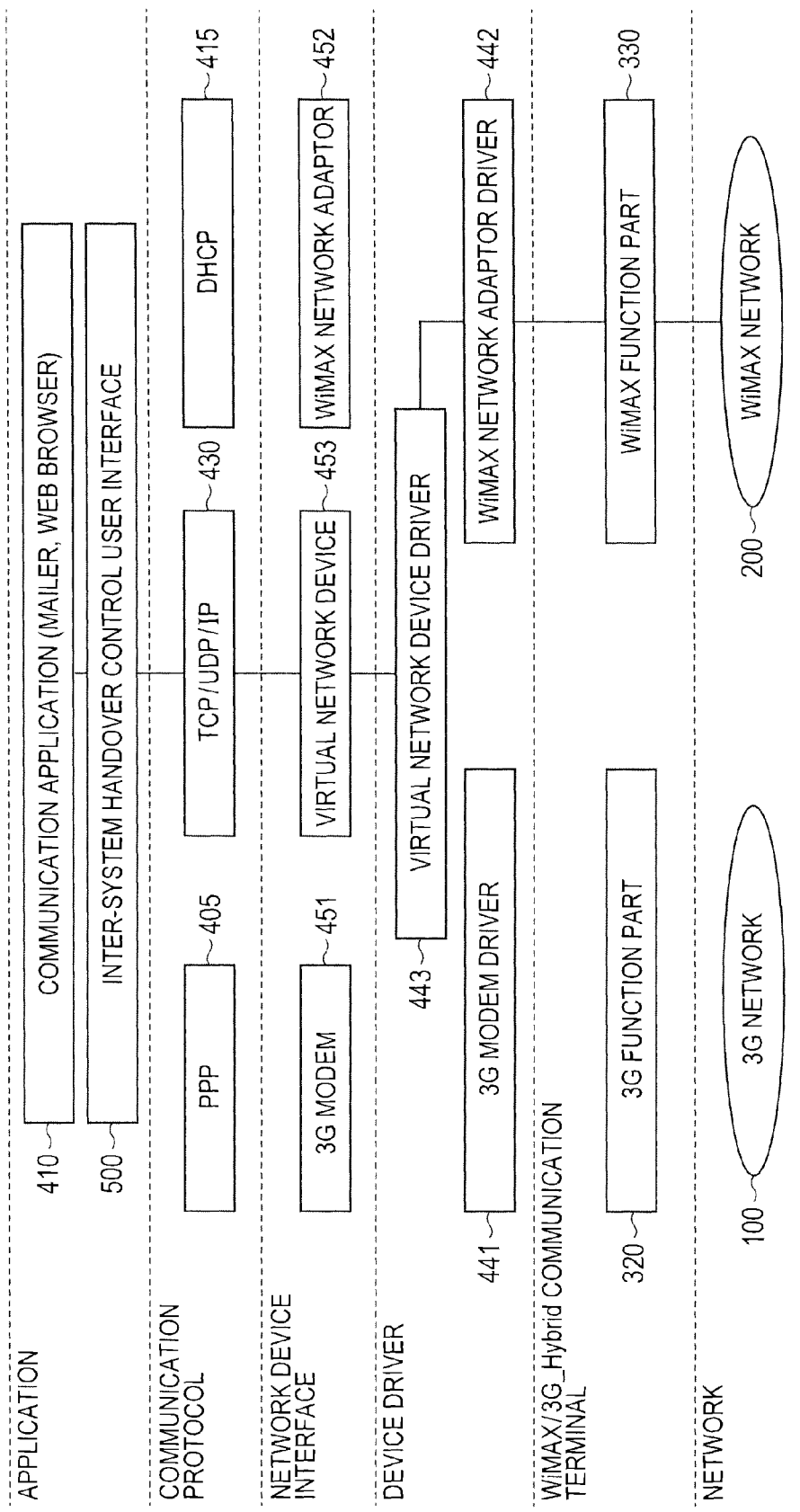
FIG. 8 is a functional block diagram showing the flow of data during communication with the WiMAX network.

FIG. 8 shows the flow of data when the communication application 410 performs the communication with the WiMAX network 200. In FIG. 8, the virtual network device 453 transmits the user data from the communication application 410 to the virtual network device 443. The virtual network device 443 transfers user data to the WiMAX device driver 442 during the communication connection. Accordingly, the user data can be transferred to the WiMAX network 200 during the communication connection via the WiMAX function part 330.

Next, a WiMAX network adaptor driver 442 receives data from the WiMAX network 200 via the WiMAX function part 330. The WiMAX network adaptor driver 442 transfers the data to the virtual network device 443. Accordingly, the data from the WiMAX network 200 can be transferred to the communication application via the virtual network device 453.

As one method for enabling the communication application to surely transfer the user data to the virtual network device during data communication, there is a method which makes use of a default gateway which can be set on the OS of the PC during the communication connection processing. To be more specific, in setting a default gateway of a virtual network device, when an IP address set in the virtual network device is 119.105.100.100, the gateway is also set to 119.105.100.100 in the same manner. Accordingly, the default gateway can transfer the user data of communication application to the virtual network device.

In the same manner, with respect to setting of a route between the virtual network driver 453 and the 3G modem driver 441 and a route between the virtual network driver 453 and the 3G modem driver 441, an IP address in a network device in the higher order of these device drivers is set during communication connection processing and hence, such route setting can be controlled by providing a routing table where the IP address can be set on the OS of the PS during the communication connection processing along the route contents described above. It is needless to say that a method which controls the flow of data by providing an interface for user table transfer to respective data drivers can be used.

Next, the operation sequence at the time of newly connecting the communication terminal to the 3G network 100 and the WiMAX network 200 and at the time of disconnecting the connection, and operation sequence at the time of switching the system between both networks 100, 200 will be explained in conjunction with FIG. 9 to FIG. 12.

<Operation at the Time of Newly Connecting Communication Terminal to WiMAX Network and at the Time of Disconnecting Connection>

Figure 9:
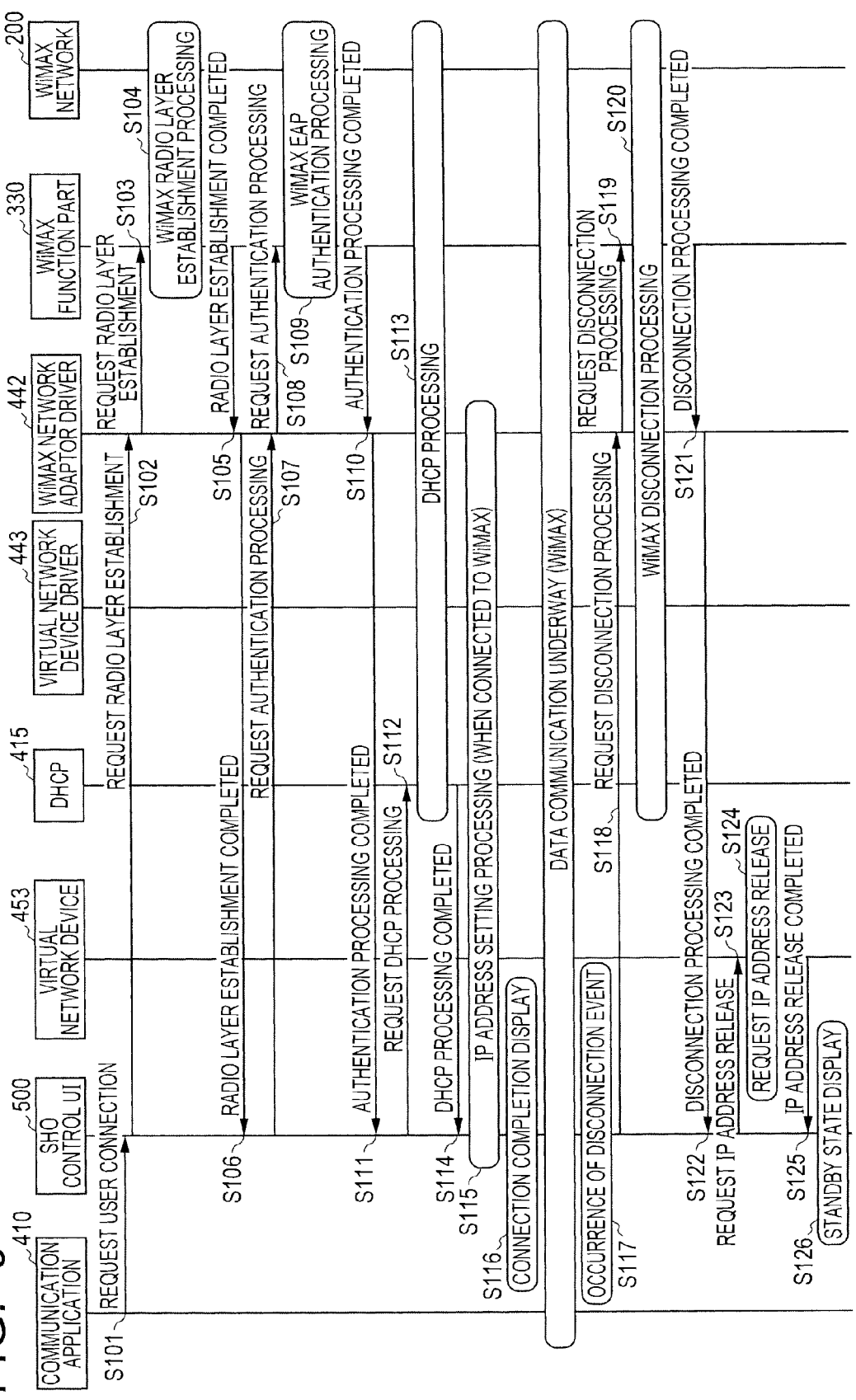
FIG. 9 is a sequence diagram at the time of newly connecting the communication terminal to the 3G network.

Processing operations at the time of newly connecting the communication terminal to the WiMAX network 200 and at the time of disconnecting the connection will be explained in conjunction with FIG. 9. In FIG. 9, the communication application 410 transmits a connection request to the control user interface (SHO control UI) 500 (S101). The control user interface (SHO control UI) 500 executes API corresponding to the connection request. To be more specific, the control user interface (SHO control UI) 500 transmits a radio layer establishment request to the WiMAX network adaptor driver 442 (S102). The WiMAX network adaptor 442 transmits a radio layer establishment request to a WiMAX function part 330 (S103). The WiMAX function part 330, upon receiving the request signal, executes WiMAX radio layer establishment processing with the WiMAX network 200 (S104). When the processing is completed, the WiMAX function part 330 transmits radio layer establishment completion notification to the WiMAX network adaptor driver 442 (S105). The WiMAX network adaptor driver 442, upon receiving the radio layer establishment completion notification, transmits the radio layer establishment completion notification to the control user interface 500 (S106).

Next, control user interface 500, to execute the EAP authentication, executes API corresponding to the EAP authentication. To be more specific, the control user interface 500 transmits an authentication processing request to the WiMAX network adaptor driver 442 (S107). The WiMAX network adaptor 442 transfers the authentication processing request to the WiMAX function part 330 (S108). The WiMAX function part 330, upon receiving the request signal, executes WiMAX EAP processing with the WiMAX network 200 (S109). When the processing is completed, the WiMAX function part 330 transmits the authentication processing completion notification to the WiMAX network adaptor driver 442 (S110). The WiMAX network adaptor driver 442 transmits the authentication processing completion notification to the control user interface 500 (S111).

Next, the control user interface 500, to execute the DHCP, executes the API corresponding to the DHCP. To be more specific, the control user interface 500 transmits a DHCP processing request to the DHCP 415 which is a function on the OS (S112). The DHCP 415, upon receiving the request, executes DHCP processing with the WiMAX network 200 (S113). When the processing is normally completed, the DHCP 415 transmits a DHCP completion notification to the control user interface 500 (S114).

Upon receiving the completion notification, the control user interface 500 applies IP address setting processing to the virtual network device 453 and the WiMAX network adaptor 452 (S115). Upon completion of normal setting processing, the control user interface 500 displays connection completion on a user interface 510 (S116). Through these steps, the communication application 410 and the WiMAX network 200 are brought into a communication state.

In such a communication state, the control user interface 500 detects a disconnection event (S117). The control user interface 500 transmits a disconnection processing request to the WiMAX network adaptor driver 442 (S118). The WiMAX network adaptor driver 442, upon receiving the request, transmits a disconnection processing request to the WiMAX function part 330 (S119). The WiMAX function part 330, upon receiving the request, executes WiMAX disconnection processing in association with the DHCP 415 (S120). When the disconnection processing is completed, the WiMAX function part 330 transmits disconnection processing completion notification to the WiMAX network adaptor driver 442 (S121). The WiMAX network adaptor driver 442, upon receiving the completion notification, transmits the disconnection processing completion notification to the control user interface 500 (S122).

The control user interface 500, upon receiving the completion notification, transmits an IP address release request to the virtual network device 453 (S123). The virtual network device 453 executes IP address release processing (S124). The virtual network device 453 transmits an IP address release completion message to the control user interface 500 (S125). The control user interface 500 confirms whether or not release processing is properly executed and, thereafter, confirms that the priority network is shifted to a standby state, and displays the standby state on the user interface 510 (S126).

<Operation at the Time of Newly Connecting Communication Terminal to 3G Network and at the Time of Disconnecting the Connection>

Figure 10:
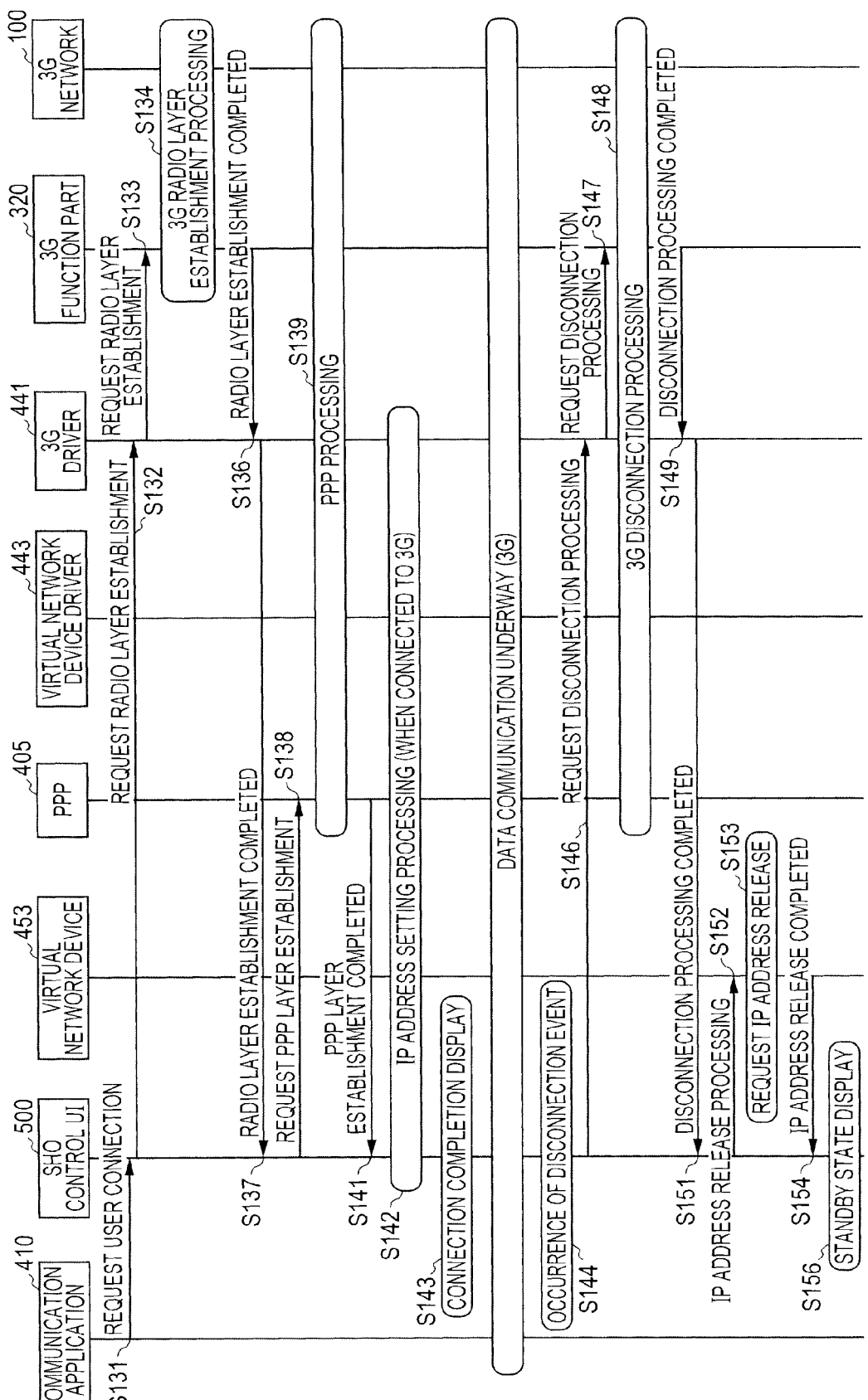
FIG. 10 is a sequence diagram at the time of newly connecting the communication terminal to the WiMAX network.

Processing operations at the time of newly connecting the communication terminal to the 3G network 100 and at the time of disconnecting the connection will be explained in conjunction with FIG. 10. In FIG. 10, the communication application 410 transmits a user connection request to the inter-system handover control user interface (SHO control UI) 500 (S131). Upon receiving the connection request S101 from the communication application 410, the control user interface (SHO control UI) 500 executes API corresponding to the connection request S101. To be more specific, the control user interface 500 transmits a radio layer establishment request to the 3G modem driver 441 (S132). The 3G modem driver 441 transmits a radio layer establishment request to the 3G function part 320 (S133). The 3G function part 320, upon receiving the request signal, executes 3G radio layer establishment processing with the 3G network 100 (S134). The 3G function part 320, when processing is completed, transmits the radio layer establishment completion notification to the 3G modem driver 441 (S136). The 3G modem driver 441, upon receiving the completion notification, transmits the radio layer establishment completion notification to the control user interface 500 (S137).

The control user interface 500, to execute the PPP processing, executes API corresponding to the PPP processing. To be more specific, the control user interface 500 transmits a PPP layer establishment request to the PPP 405 which is a function on the OS (S138). The PPP 405, upon receiving the request, executes PPP processing with the 3G network 100 (S139). The PPP 405, when the processing is normally completed, transmits a PPP completion notification to the control user interface 500 (S141).

Next, the control user interface 500 applies IP address setting processing S135 to the virtual network device 453 and the 3G modem 451 (S142). When the setting processing is normally completed, the control user interface 500 displays connection completion on the user interface 510 (S143). Through these steps, the communication application 410 and the 3G network 100 are brought into a communication state.

The control user interface 500 detects a disconnection event from the user or the communication application 410 (S144). The control user interface 500 transmits a disconnection processing request to the 3G modem driver 441 (S146). The 3G modem driver 441, upon receiving the request, transmits a disconnection processing request to the 3G function part 320 (S147). The 3G function part 320, upon receiving the request, executes 3G disconnection processing in association with the PPP 405 (S148). The 3G function part 320, when the disconnection processing is completed, transmits a disconnection processing completion notification to the 3G modem driver 441 (S149). The 3G modem driver 441, upon receiving the completion notification, transmits a disconnection processing completion notification to the control user interface 500 (S151).

The control user interface 500, upon receiving a completion notification, transmits an IP address release request to the virtual network device 453 (S152). The virtual network device 453 executes IP address release processing (S153). The virtual network device 453 transmits an IP address release completion notification to the control user interface 500 (S154). The control user interface 500 confirms that the priority network is shifted to a standby state, and displays the standby state on the user interface 510 (S156).

<Connection Switching Operation from WiMAX Network to 3G Network>

Figure 11:
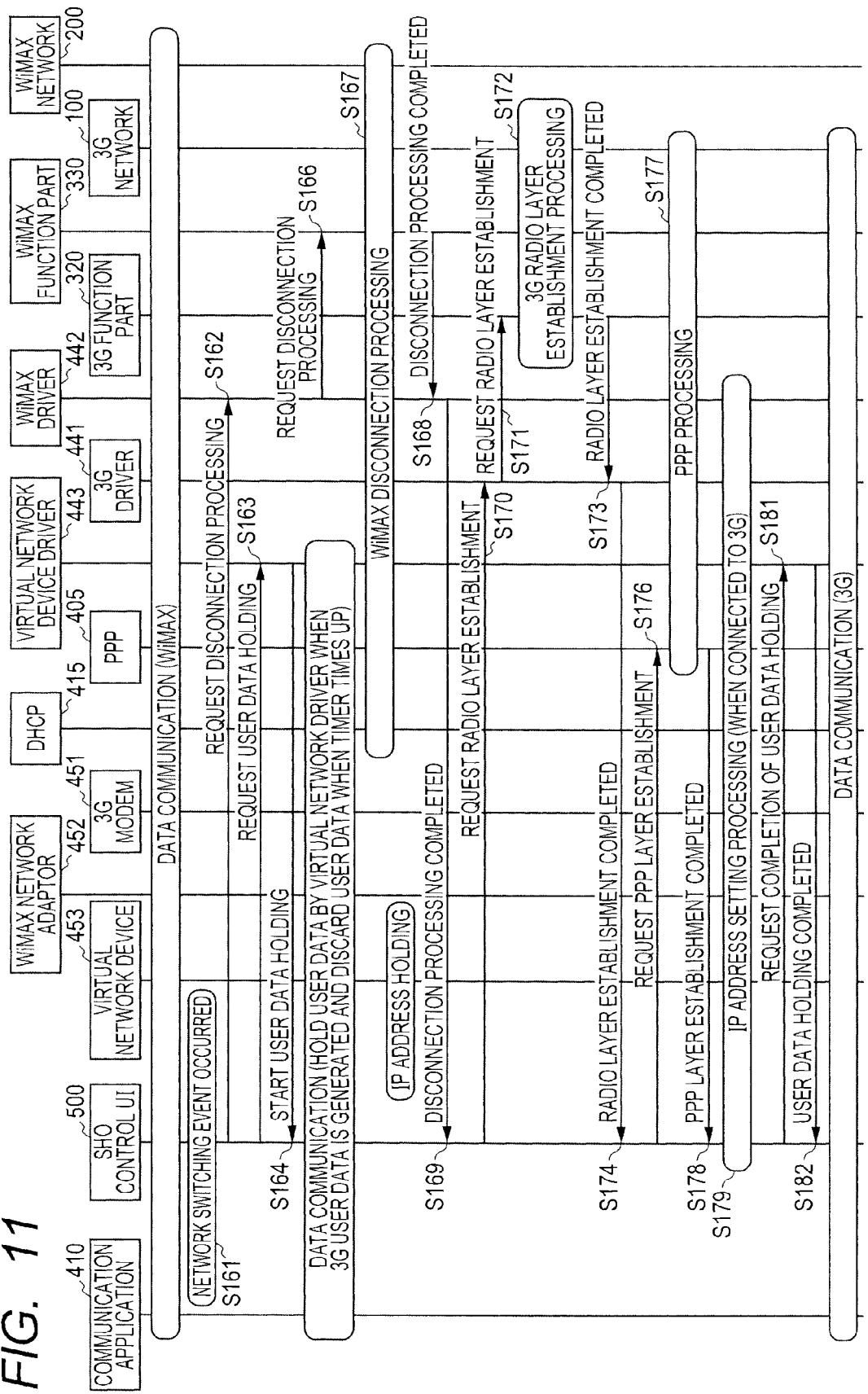
FIG. 11 is a sequence diagram at the time of switching the connection to the 3G network during communication with the WiMAX network.

Connection switching processing from the WiMAX network 200 to the 3G network 100 will be explained in conjunction with FIG. 11. In FIG. 11, the communication application 410 is in a communication state with the WiMAX network 200. In such a state, the control user interface 500 detects a network switching event corresponding to a preset priority connection setting (S161). The control user interface 500 transmits a disconnection processing request to the WiMAX network adaptor driver 442 (S162). Next, the control user interface 500 transmits a user data holding request to the virtual network device driver 443 (S163). The virtual network device driver 443, when the processing is started, transmits a user data holding start notification to the control user interface 500 (S164). In a network switching period, buffering is performed between the communication application 410 and the virtual network device 443 for a fixed period. However, when a network switching is not completed within a certain period, buffering of user data is stopped, and user data which is subjected to the buffering until then is discarded. Further, the virtual network device 453 holds an IP address.

The WiMAX network adaptor driver 442, upon receiving a disconnection processing request signal, transmits a disconnection processing request to the WiMAX function part 330 (S166). The WiMAX function part 330, upon receiving the request, executes WiMAX disconnection processing in association with the DHCP 415 (S167). The WiMAX function part 330, when disconnection processing is completed, transmits a disconnection processing completion notification to the WiMAX network adaptor driver 442 (S168). The WiMAX network adaptor driver 442, upon receiving a completion notification, transmits a disconnection processing completion notification to the control user interface 500 (S169).

The control user interface 500, upon receiving a completion notification, executes API corresponding to the completion notification. To be more specific, the control user interface 500 transmits a radio layer establishment request to the 3G modem driver 441 (S170). The 3G modem driver 441 transmits a radio layer establishment request to the 3G function part 320 (S171). The 3G function part 320, upon receiving the request signal, executes 3G radio layer establishment processing with the 3G network 100 (S172). The 3G function part 320, when the processing is completed, transmits a radio layer establishment completion notification to the 3G modem driver 441 (S173). The 3G modem driver 441, upon receiving a completion notification, transmits a radio layer establishment completion notification to the control user interface 500 (S174).

The control user interface 500, to execute the PPP processing, executes API corresponding to the PPP processing. To be more specific, the control user interface 500 transmits a PPP layer establishment request to the PPP 405 which is a function on the OS (S176). The PPP 405, upon receiving the request, executes PPP processing with the 3G network 100 (S177).

The PPP 405, when the processing is normally completed, transmits a PPP completion notification to the control user interface 500 (S178).

The control user interface 500, upon receiving a completion notification, applies IP address setting processing to the virtual network device 453 and the 3G modem 451 (S179). The control user interface 500, when the setting processing is normally completed, transmits a user data holding completion request to the virtual network device driver (S181). The virtual network device driver stops buffering of user data, and transmits a user data holding completion notification to the control user interface 500 (S182). Due to the above-mentioned operations, user data from the communication application 410 is brought into a communication state with the 3G network 100.

<Connection Switching Operation from 3G Network to WiMAX Network>

Figure 12:
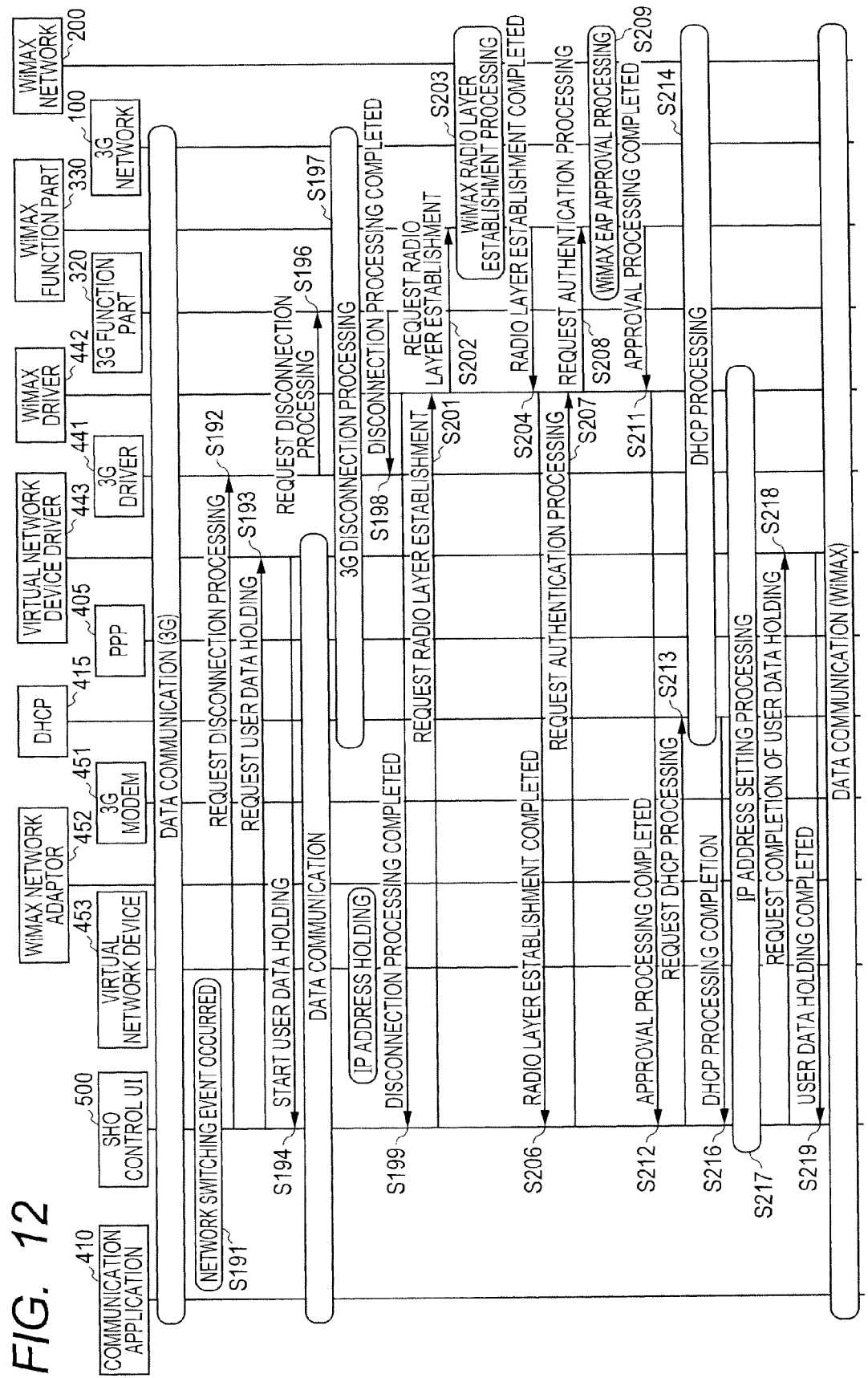
FIG. 12 is a sequence diagram at the time of switching the connection to the WiMAX network during communication with the 3G network.

Connection switching processing from the 3G network 100 to the WiMAX network 200 will be explained in conjunction with FIG. 12. In FIG. 12, the communication application 410 is in a communication state with the 3G network 100. In such a state, the control user interface 500 detects a network switching event corresponding to a preset priority connection setting (S191). The control user interface 500 transmits a disconnection processing request to the 3G modem driver 441 (S192). Next, the control user interface 500 transmits a user data holding request to the virtual network device driver 443 (S193). The virtual network device driver 443, when the processing is started, transmits a user data holding start notification to the control user interface 500 (S194). In a network switching period, buffering is performed between the communication application 410 and the virtual network device 443 for a fixed period. However, when the network switching is not completed within a certain period, the buffering of user data is stopped, and user data which is subjected to the buffering until then is discarded. Further, the virtual network device 453 holds an IP address.

The 3G modem driver 441, upon receiving a disconnection processing request, transmits a disconnection processing request to the 3G function part 320 (S196). The 3G function part 320, upon receiving the request, executes 3G disconnection processing in association with the PPP 405 (S197). The 3G function part 320, when the disconnection processing is completed, transmits a disconnection processing completion notification to the 3G modem driver 441 (S198). The 3G modem driver 441, upon receiving the completion notification, transmits a disconnection processing completion notification to the control user interface 500 (S199).

The control user interface 500, upon receiving a completion notification, executes API corresponding to the completion notification. To be more specific, the control user interface 500 transmits a radio layer establishment request to the WiMAX network adaptor driver 442 (S201). The WiMAX network adaptor 442 transmits a radio layer establishment request to the WiMAX function part 330 (S202). The WiMAX function part 330, upon receiving the request signal, executes WiMAX radio layer establishment processing with the WiMAX network 200 (203). The WiMAX function part 330, when the processing is completed, transmits a radio layer establishment completion notification to the WiMAX network adaptor driver 442 (S204). The WiMAX network adaptor driver 442, upon receiving the radio layer establishment completion notification, transmits a radio layer establishment completion notification to the control user interface 500 (S206).

The control user interface 500, to execute the EAP authentication, executes the API corresponding to the EAP authentication. To be more specific, the control user interface 500 transmits an authentication processing request to the WiMAX network adaptor driver 442 (S208). The WiMAX network adaptor 442 transmits the authentication processing request to the WiMAX function part 330 (S209). The WiMAX function part 330, upon receiving the request signal, executes WiMAX EAP processing with the WiMAX network 200 (S209). The WiMAX function part 330, when the processing is completed, transmits an authentication processing completion notification to the WiMAX network adaptor driver (S211). The WiMAX network adaptor driver 442 transmits the authentication processing completion notification to the control user interface 500 (S212).

The control user interface 500, to execute the DHCP, executes the API corresponding to the DHCP. To be more specific, the control user interface 500 transmits a DHCP processing request to the DHCP 415 which is a function on the OS (S213). The DHCP 415, upon receiving the request, executes the DHCP processing with the WiMAX network 200 (S214). The DHCP 415, when the processing is completed, transmits a DHCP completion notification to the control user interface 500 (S216).

The control user interface 500, upon receiving a completion notification, applies IP address setting processing to the virtual network device 453 and the WiMAX network adaptor 452 (S217). When the setting processing is normally completed, the control user interface 500 transmits a user data holding completion request to the virtual network device driver 443 (S218). The virtual network device driver 443 stops buffering of user data and transmits a user data holding completion notification to the control user interface 500 (S19). Due to the above-mentioned operations, the communication application 410 is brought into a communication state with the WiMAX network 200.

Next, IP address substitution processing and an IP address setting method at the time of newly connecting the communication terminal to the 3G network 100 and the WiMAX network 200, and IP address substitution processing and an IP address setting method at the time of switching the system between the 3G network 100 and the WiMAX network 200 will be explained in conjunction with FIG. 13 to FIG. 16.
<IP Address Substitution Processing Method at the Time of Connecting Communication Terminal to WiMAX Network: (1)>

Figure 13:
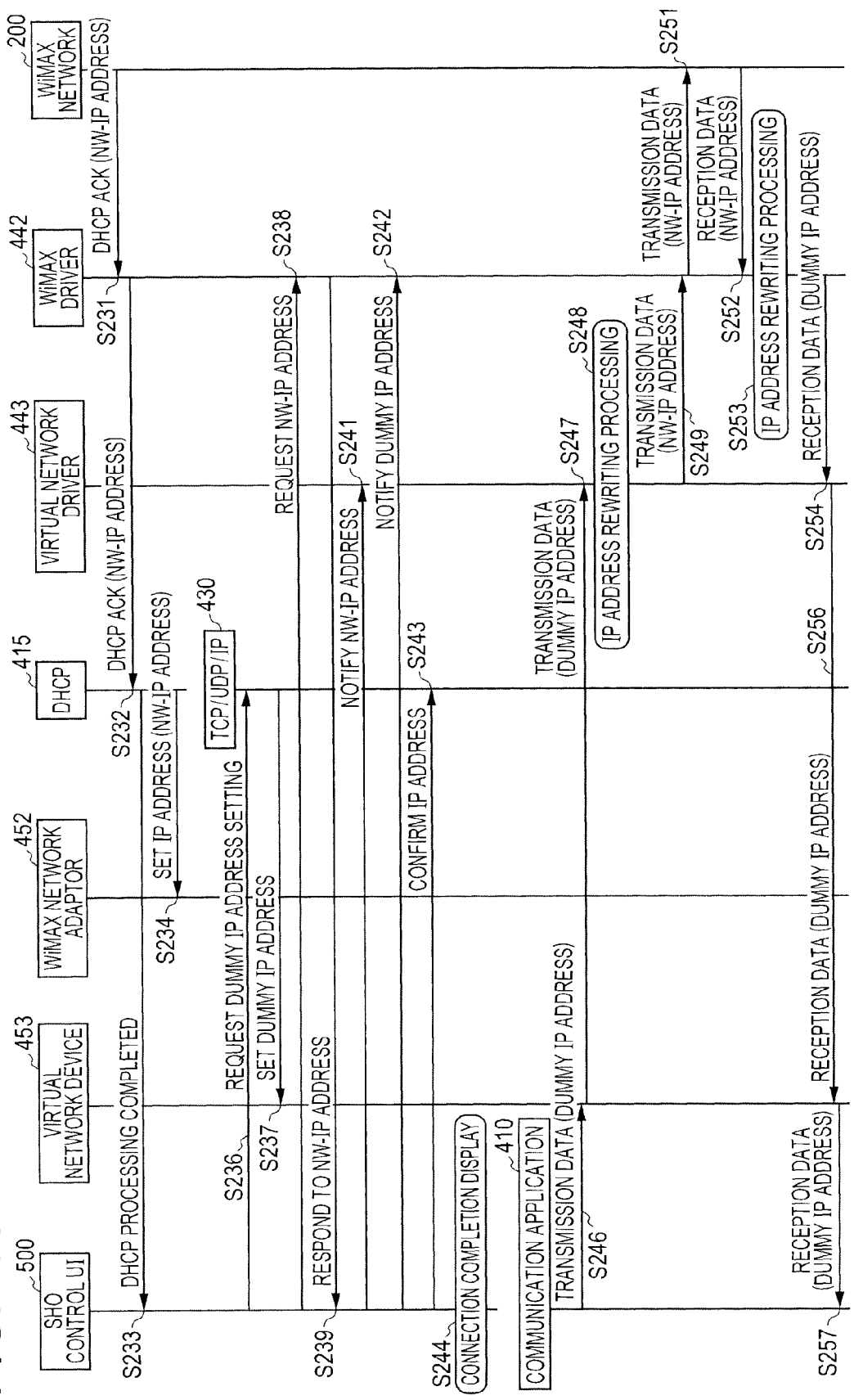
FIG. 13 is a sequence diagram for explaining the IP address substitution at the time of newly connecting the communication terminal to the WiMAX network or at the time of switching the connection to the WiMAX network during communication with the 3G network (a case where an IP address is changed before and after switching the system)

The IP address substitution processing at the time of newly connecting the communication terminal to the WiMAX network 200 or when the connection of communication terminal is switched to the WiMAX network 200 during the communication of the communication terminal with the 3G network 100 in a network environment where an IP address is changed before and after switching the system will be explained in conjunction with FIG. 13. In FIG. 13, the WiMAX network 200 transmits a DHCP ACK (network (NW)-IP address) to the WiMAX network adaptor driver 442 (S231). The WiMAX network adaptor driver 442 transmits a DHCP ACK (NW-IP address) having the same contents to the DHCP 415 (S232). The DHCP 415, upon receiving an ACK signal, transmits a DHCP processing completion to the control user interface 500 (S233). The DHCP 415 executes setting processing of an IP address assigned to the WiMAX network adaptor 452 by DHCP processing through the WiMAX network 100 (S234).

The control user interface 500 transmits a request for setting a dummy IP address to the virtual network device 453 to the TCP/UDP/IP 430 on the OS (S236). The TCP/UDP/IP 430, upon receiving the request signal, sets a dummy IP address to the virtual network device 453 (S237).

Here, at the time of switching the system, a series of dummy IP address setting (S236 and S237) to the virtual network adaptor is unnecessary.

The control user interface 500 transmits a signal which requires a content of a network IP address which is assigned by the WiMAX network 200 to the WiMAX network adaptor driver 442 (S238). The WiMAX network adaptor driver 442, upon receiving the request signal, transmits a network IP address response signal to the control user interface 500 (S239). The control user interface 500, upon receiving the response signal, notifies the content of the network IP address to the virtual network device 443 (S241). Next, the control user interface 500 notifies the content of the dummy IP address to the WiMAX network adaptor driver 442 (S242). The control user interface 500 confirms that a network IP address is set to the WiMAX network adaptor 442 and a dummy IP address is set to the virtual network device using the TCP/UDP/IP 430 (S243). The control user interface 500 displays a connection completion on the user interface 510 (S244).

Here, the reason the content of the network IP address is notified to the virtual network device driver 443 and the content of the dummy IP address is notified to the WiMAX network adaptor driver is to rewrite an IP address in an IP packet of user data described later.

Next, the communication application 410 transmits transmission data designated to a dummy IP address to the virtual network device 453 (S246). The virtual network device 453, upon receiving transmission data to which a dummy IP address set to the virtual network device 453 per se is set as a transmission source IP address from the communication application 410, transmits transmission data to the virtual network device driver 443 in the same manner (S247). The virtual network device driver 443, upon receiving transmission data, executes rewriting processing of a transmission source IP address from a dummy IP address to a network IP address which is notified in step 241 (S248). The virtual network device driver 443 transmits transmission data where an IP address assigned by the network is set as a transmission source IP address to the WiMAX network adaptor driver 442 (S249). The WiMAX network adaptor driver 442, upon receiving transmission data, transmits transmission data to the WiMAX network 200 via the WiMAX function part 330 (S251). Due to the above-mentioned operations, it is possible to transmit user data from the communication application 410 to the WiMAX network 200.

Next, the WiMAX network 200 transmits reception data to the WiMAX network adaptor driver 442 (S252). The WiMAX network adaptor driver 442, upon receiving reception data from the WiMAX network 200, rewrites a designation IP address in reception data set to the WiMAX network adapter 452 to a dummy IP address set to virtual network device 453 (S253) which is notified in step 242. Thereafter, the WiMAX network adaptor driver 442 transmits reception data to the virtual network device driver 443 (S254). The virtual network device driver 443, upon receiving data, transmits the reception data to the virtual network device 453 (S256). The virtual network device 453, upon receiving data, transmits the reception data to the communication application 410 (S257).

Due to the above-mentioned IP address substitution processing and IP address setting, it is possible to transmit data from the WiMAX network 200 to the communication application 410.

<IP Address Substitution Processing Method at the Time of Connecting Communication Terminal to 3G Network: (1)>

The IP address substitution processing at the time of newly connecting the communication terminal to the 3G network 100 or when the connection of communication terminal is switched to the 3G network 100 during the communication of the communication terminal with the WiMAX network 200 in a network environment where an IP address is changed before and after switching the system will be explained in conjunction with FIG. 14. In FIG. 14, the 3G network 100 transmits an IPCP_NAC (NW-IP address) to the 3G driver 441 in accordance with generally-used IPCP processing in the PPP (S261). The 3G driver 441, upon receiving the IPCP_NAC (NW-IP address) in which an IP address assigned by the 3G network 100 is stored from the 3G network 100, transmits the IPCP_NAC (NW-IP address) to the PPP 405 in the same manner (S262). The PPP 405, upon receiving a NAC signal, transmits an IPCP request (NW-IP address) to the 3G modem driver 441 (S263). The 3G modem driver 441, upon receiving a signal, transmits the IPCP request (NW-IP address) to the 3G network 100 through the 3G function part 320 in the same manner (S264). The 3G network 100, upon receiving the signal, transmits an IPCP_ACK (NW-IP address) to the 3G modem driver 441 (S266). The 3G modem driver 441, upon receiving the signal, transmits the IPCP_ACK (NW-IP address) to the PPP 405 in the same manner (S267). The PPP 405, upon receiving the signal, transmits a PPP layer establishment completion S134 to the control user interface 500 (S268). The PPP 405 executes setting processing of an IP address assigned to the 3G modem 451 by IPCP processing through 3G network 100 (S269).

The control user interface 500 transmits a request for setting a dummy IP address to the virtual network device 453 to the TCP/UDP/IP 430 on the OS (S271). The TCP/UDP/IP 430, upon receiving the request signal, sets a dummy IP address to the virtual network device 453 (S272).

Here, at the time of switching the system, a series of dummy IP address setting (S236 and S237) to the virtual network adaptor is unnecessary.

The control user interface 500 transmits a signal which requests a content of a network IP address which is assigned by the NW to the 3G modem driver 441 (S273). The 3G modem driver 441, upon receiving the request signal, transmits a network response signal to the control user interface 500 (S274). The control user interface 500, upon receiving the response signal, notifies the content of the network IP address to the virtual network device 443 (S276). Next, the control user interface 500 notifies a content of a dummy IP address to the 3G modem driver 441 (S277). The control user interface 500 confirms that the network IP address is set to the 3G modem driver 441 and the dummy IP address is set to the virtual network device 453 using the TCP/UDP/IP 430 (S278). The control user interface 500 displays the connection completion on the user interface 510 (S279).

Here, the reason the content of the network IP address is notified to the virtual network device driver 443 and the content of the dummy IP address is notified to the 3G modem driver 441 is to rewrite an IP address in an IP packet of user data described later.

Next, the communication application 410 transmits transmission data to the virtual network device 453 (S281). The virtual network device 453, upon receiving transmission data to which a dummy IP address set to the virtual network device 453 per se is set as a transmission source IP address from the communication application 410, transmits transmission data to the virtual network device driver 443 in the same manner (S282). The virtual network device driver 443, upon receiving transmission data, executes rewriting processing of a transmission source IP address from a dummy IP address to a network IP address which is notified in step 276 (S283). Thereafter, the virtual network device driver 443 transmits transmission data where an IP address assigned by the network is set as a transmission source IP address to the 3G modem driver 441 (S284). The 3G modem driver 441, upon receiving transmission data, transmits transmission data to the 3G network 100 through the 3G function part (S286). Due to the above-mentioned operations, it is possible to transmit user data from the communication application 410 to the 3G network 100.

Next, the 3G network 100 transmits reception data to the 3G modem driver 441 (S287). The 3G modem driver 441, upon receiving reception data from the 3G network 100, rewrites a designation IP address in reception data set to the 3G modem driver 441 to a dummy IP address set to the virtual network device 453 which is notified in step 277 (S288). Thereafter, the 3G modem driver 441 transmits reception data to the virtual network device driver 443 (S289). The virtual network device driver 443, upon receiving data, transmits same reception data to the virtual network device 453 (S291). The virtual network device 453, upon receiving data, transmits same reception data to the communication application 410 (S292). Due to the above-mentioned IP address substitution processing and IP address setting, it is possible to transmit data from the 3G network 100 to the communication application 410.

Embodiment 2

<IP Address Substitution Processing Method at the Time of Connecting Communication Terminal to WiMAX Network (2)>

The IP address substitution processing at the time of newly connecting the communication terminal to the WiMAX network 200 or when the connection of communication terminal is switched to the WiMAX network 200 during the communication of the communication terminal with the 3G network 100 in a network environment where an IP address is not changed before and after switching the system will be explained in conjunction with FIG. 15. In FIG. 15, the WiMAX network 200 transmits a DHCP ACK (NW-IP address) to the WiMAX driver 442 in accordance with generally-used DHCP processing (S301). The WiMAX network adaptor driver 442, upon receiving a DHCP ACK (NW-IP address) from the WiMAX network 200, rewrites a network IP address assigned by the WiMAX network 200 stored in a DHCP ACK message to a dummy IP address which is notified from the control user interface 500 in a step before DHCP processing is executed (S302). Thereafter, the WiMAX network adaptor driver 442 transmits the rewritten DHCP ACK (dummy IP address) to the DHCP 415 (S303). The DHCP 415, upon receiving the ACK signal, transmits DHCP processing completion to the control user interface 500 (S304). The DHCP 415 executes setting processing of an IP address which is notified to the WiMAX network adaptor S452 from the control user interface 500 (S306).

The control user interface 500 transmits a signal which requests a content of a network IP address which is assigned by the WiMAX network 200 to the WiMAX network adaptor driver 442 (S307). The WiMAX network adaptor driver 442, upon receiving the request signal, transmits the content of the network IP address which is assigned by the WiMAX network 200 to the control user interface 500 (S308). The control user interface 500 transmits a request for setting the network IP address to the virtual network device 453 to the TCP/UDP/

IP 430 on the OS (S309). The TCP/UDP/IP 430, upon receiving the request signal, sets the network IP address to the virtual network device 453 (S311). The control user interface 500 confirms that the dummy IP address is set in the WiMAX network adaptor 442 and the network IP address is set in the virtual network device 453 using the TCP/UDP/IP 430 (S312). The control user interface 500 displays the connection completion on the user interface 510 (S313).

Here, at the time of switching the system, a series of dummy IP address setting to the virtual network adaptor is unnecessary and hence, step 309 and step 311 are unnecessary.

In following step 314 to step 323, the flow of data transmission from the communication application 410 to the WiMAX network 200 and the flow of the data reception from the WiMAX network 200 to the communication application 410 will be explained. This processing, however, is flows of generally-executed processing when data communication is performed in a state where an IP address is not substituted and a mobile unit is connected to a PC. These steps are provided as reference information for comparison with the <IP address substitution processing method at the time of connecting communication terminal to WiMAX network (1)> and hence, the detailed explanation of these steps is omitted.

<IP Address Substitution Processing Method at the Time of Connecting Communication Terminal to 3G Network (2)>

The IP address substitution processing at the time of newly connecting the communication terminal to the 3G network 100 or when the connection of communication terminal is switched to the 3G network 100 during the communication of the communication terminal with the WiMAX network 200 in a network environment where an IP address is not changed before and after switching the system will be explained in conjunction with FIG. 16. In FIG. 16, the 3G network 100 transmits an IPCP_NAC (NW-IP address) in which the assigned IP address is stored to the 3G modem driver 441 in accordance with generally-used IPCP processing steps in PPP (S331). The 3G modem driver 441, upon receiving the IPCP_NAC (NW-IP address) from the 3G network 100, rewrites the network IP address which is stored in the IPCP_NAC message and is assigned by the 3G network 100 to a dummy IP address which is notified by the control user interface 500 in a step before PPP processing is executed (S332). Thereafter, the 3G modem driver 441 transmits the rewritten IPCP_NAC (dummy IP address) to the PPP 405 (S333). The PPP 405, upon receiving the NAC signal, transmits an IPCP request (dummy IP address) to the 3G modem driver 441 (S334). The 3G modem driver 441, upon receiving the signal, rewrites the dummy IP address which is stored in the IPCP request to a network IP address (S336). The 3G modem driver 441 transmits the IPCP request (NW-IP address) to the 3G network 100 through the 3G function part 320 in the same manner (S337). The 3G network 100, upon receiving the signal, transmits an IPCP_ACK (NW-IP address) to the 3G modem driver 441 (S338). The 3G modem driver 441, upon receiving the signal, rewrites a network IP address which is stored in the IPCP_ACK message to a dummy IP address (S339). The 3G modem driver 441 transmits the rewritten IPCP_ACK (dummy IP address) to the PPP 405 (S341). The PPP 405, upon receiving the signal, transmits the PPP layer establishment completion to the control user interface 500 (S342). The PPP 405 applies dummy IP address setting processing to the 3G modem 451 (S343).

The control user interface 500 transmits a signal which requests a content of a network IP address which is assigned by the 3G network 100 to the 3G modem driver 441 (S344).

The 3G modem driver 441, upon receiving the request signal, transmits a network response signal to the control user interface 500 (S346). The control user interface 500, upon receiving the response signal, transmits a request for setting a network IP address to the virtual network device 453 to the TCP/UDP/IP 430 on the OS (S347). The TCP/UDP/IP 430, upon receiving the request signal, sets a network IP address to the virtual network device 453 (S348). The control user interface 500 confirms the TCP/UDP/IP 430 that the dummy IP address is set to the 3G adaptor 442 and the network IP address is set to the virtual network device 453 (S349). The control user interface 500 displays connection completion on the user interface 510 (S351).

At the time of switching the system, a series of network IP address setting to the virtual network adaptor is unnecessary basically under an environment where an IP address is not changed before and after switching the system and hence, such network IP address setting is unnecessary whereby step 347 and step 348 are unnecessary.

In following step 352 to step 361, the flow of data transmission from the communication application 410 to the 3G network 100 and the flow of the data reception from the 3G network 100 to the communication application 410 are explained. This processing, however, are flows of generally-executed processing when data communication is performed in a state where an IP address is not substituted and a mobile unit is connected to a PC. These steps are provided as reference information for comparison with the <IP address substitution processing method at the time of connecting communication terminal to 3G network (1)> and hence, the detailed explanation of these steps is omitted.

What is claimed is:

1. A hybrid communication terminal which is connected to a 3G network and a WIMAX network, controls a handover from a handover transmission source network to a handover transmission destination network, is connected to a computer, comprising:
    an installer which installs a handover controller to the computer when the hybrid communication terminal is connected to the computer at the first time,
    wherein, when that a second IP address assigned to the hybrid communication terminal by the handover transmission destination network differs from a first IP address assigned to the communication terminal by the handover transmission source network,
    the hybrid communication terminal is controlled by the handover controller in accordance with an instruction from the computer,
    a virtual network device is set on an operating system of the computer, a dummy IP address is set in the virtual network device during communication connection processing with the handover transmission source network, and the first IP address assigned by the handover transmission source network is set in a network device corresponding to the handover transmission source network,
    a virtual driver of the virtual network device rewrites a transmission source IP address of user data transmitted from a communication application to the first IP address from the dummy IP address during user data communication, and
    a driver of the network device rewrites a transmission destination IP address of data from the handover transmission source network to the dummy IP address from the first IP address during the user data communication.

* * * * *